(12) United States Patent
Zenitani et al.

(10) Patent No.: US 12,077,443 B2
(45) Date of Patent: Sep. 3, 2024

(54) SILICA PARTICLES AND METHOD FOR PRODUCING THE SAME

(71) Applicant: FUJIFILM Business Innovation Corp., Tokyo (JP)

(72) Inventors: Yuka Zenitani, Kanagawa (JP); Sakae Takeuchi, Kanagawa (JP); Koji Sasaki, Kanagawa (JP); Yoshifumi Eri, Kanagawa (JP); Mai Mochida, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 17 days.

(21) Appl. No.: 17/649,692

(22) Filed: Feb. 2, 2022

(65) Prior Publication Data

US 2022/0315431 A1 Oct. 6, 2022

(30) Foreign Application Priority Data

Mar. 25, 2021 (JP) ................................. 2021-052444
Sep. 24, 2021 (JP) ................................. 2021-156195

(51) Int. Cl.
*C01B 33/149* (2006.01)

(52) U.S. Cl.
CPC ........ *C01B 33/149* (2013.01); *C01P 2002/86* (2013.01); *C01P 2004/32* (2013.01); *C01P 2004/62* (2013.01); *C01P 2004/64* (2013.01); *C01P 2006/16* (2013.01)

(58) Field of Classification Search
CPC ............... C01B 33/149; C01P 2002/86; C01P 2004/32; C01P 2004/62; C01P 2004/64; C01P 2006/16

USPC ........................................................ 423/338
See application file for complete search history.

(56) References Cited

U.S. PATENT DOCUMENTS 9,523,931 B2 * 12/2016 Kojima .............. G03G 9/08795
2014/0370427 A1 * 12/2014 Sasaki ................ G03G 9/09725
430/108.7

FOREIGN PATENT DOCUMENTS

| JP | 09-166884 A | 6/1997 |
| JP | 2001-194825 A | 7/2001 |
| JP | 2011-185998 A | 9/2011 |
| JP | 2017-039618 A | 2/2017 |
| JP | 2019-073418 A | 5/2019 |
| JP | 2020-033224 A | 3/2020 |

OTHER PUBLICATIONS

Bippus et al. "Thermal conductivity of heat treated mesoporous silica particles". Microporous and Mesoporous Materials 190 (2014) p. 109-116. (Year: 2014).*

* cited by examiner

*Primary Examiner* — Coris Fung
*Assistant Examiner* — Catriona M Corallo
(74) *Attorney, Agent, or Firm* — Sughrue Mion, PLLC

(57) ABSTRACT

Silica particles include a nitrogen-containing compound. When the volumes of pores having a diameter of 1 nm or more and 50 nm or less, the volumes being determined from a pore size distribution curve of the silica particles before and after the silica particles are baked at 350° C., the pore size distribution curve being obtained by nitrogen gas adsorption, are defined as A and B, respectively, B/A is 1.2 or more and 5 or less and B is 0.2 cm$^3$/g or more and 3 cm$^3$/g or less.

17 Claims, No Drawings

SILICA PARTICLES AND METHOD FOR PRODUCING THE SAME

CROSS-REFERENCE TO RELATED APPLICATIONS

This application is based on and claims priority under 35 USC 119 from Japanese Patent Application No. 2021-052444 filed Mar. 25, 2021 and Japanese Patent Application No. 2021-156195 filed Sep. 24, 2021.

BACKGROUND

(i) Technical Field

The present disclosure relates to silica particles and a method for producing the silica particles.

(ii) Related Art

Silica particles are used as an additive for or principal component of powder paint, cosmetics, a rubber, an abrasive, or the like and responsible for, for example, an increase in resin strength, improvement of powder flowability, and a reduction in the occurrence of packing.

For example, Japanese Laid Open Patent Application Publication No. 2019-073418 discloses a hydrophobic silica powder, wherein (1) the hydrophobic silica powder has a hydrophobicity of 50% or more, (2) the amount X of at least one compound selected from the group consisting of a quaternary ammonium ion, a monoazo complex, and a mineral acid ion which is extracted from the hydrophobic silica powder with a mixed solvent of methanol and an aqueous methanesulfonic acid solution is 0.1% by mass or more, and (3) the amount X and the amount Y of the above compound extracted from the hydrophobic silica powder with water satisfy Formula (I): Y/X<0.15.

Japanese Laid Open Patent Application Publication No. 2017-039618 discloses a silica powder that includes a plurality of silica particles having a silica structure that includes a "Si—O" bond as a repeating unit and a quaternary ammonium salt introduced to the silica structure.

Japanese Laid Open Patent Application Publication No. 2011-185998 discloses external charge control particles that include carrier particles that are hydrophobic spherical silica microparticles having an average size of 20 to 500 nm, which are produced by subjecting the surfaces of hydrophilic spherical silica microparticles produced by a sol-gel method to a hydrophobic treatment, and a charge controlling agent deposited on the surfaces of the carrier particles.

Japanese Laid Open Patent Application Publication No. 2001-194825 discloses silica microparticles produced by treating hydrophobic spherical silica microparticles having an average primary particle size of 0.01 to 5 µm with a compound selected from the group consisting of a quaternary ammonium salt, a fluoroalkyl group-containing betaine, and a silicone oil.

Japanese Laid Open Patent Application Publication No. H09-166884 discloses particles produced by treating silica microparticles having a hydrophobicity of 80% or more with a zwitterionic surfactant and particles produced by treating silica microparticles having a hydrophobicity of 80% or more with a quaternary ammonium salt or a polymer including a quaternary ammonium group.

SUMMARY

Aspects of non-limiting embodiments of the present disclosure relate to silica particles that have a narrow charge distribution when being charged, compared with silica particles that include a nitrogen-containing compound, wherein, when the volumes of pores having a diameter of 1 nm or more and 50 nm or less which are determined from a pore size distribution curve of the silica particles obtained by nitrogen gas adsorption before and after the silica particles are baked at 350° C. are defined as A and B, respectively, B/A is less than 1.2 or B is less than 0.2 cm$^3$/g.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there are provided silica particles including a nitrogen-containing compound, wherein, when volumes of pores having a diameter of 1 nm or more and 50 nm or less, the volumes being determined from a pore size distribution curve of the silica particles before and after the silica particles are baked at 350° C., the pore size distribution curve being obtained by nitrogen gas adsorption, are defined as A and B, respectively, B/A is 1.2 or more and 5 or less and B is 0.2 cm$^3$/g or more and 3 cm$^3$/g or less.

DETAILED DESCRIPTION

An exemplary embodiment of the present disclosure is described below. The following description and Examples are merely illustrative of the exemplary embodiment and not restrictive of the scope of the exemplary embodiment.

In the present disclosure, when numerical ranges are described in a stepwise manner, the upper or lower limit of a numerical range may be replaced with the upper or lower limit of another numerical range, respectively. In the present disclosure, the upper and lower limits of a numerical range may be replaced with the upper and lower limits described in Examples below.

Each of the components described in the present disclosure may include plural types of substances that correspond to the component.

In the present disclosure, in the case where a composition includes plural substances that correspond to a component of the composition, the content of the component in the composition is the total content of the plural substances in the composition unless otherwise specified.

Silica Particles

The silica particles according to the exemplary embodiment include a nitrogen-containing compound, wherein, when the volumes of pores having a diameter of 1 nm or more and 50 nm or less, the volumes being determined from a pore size distribution curve of the silica particles before and after the silica particles are baked at 350° C., the pore size distribution curve being obtained by nitrogen gas adsorption, are defined as A and B, respectively, B/A is 1.2 or more and 5 or less and B is 0.2 cm$^3$/g or more and 3 cm$^3$/g or less.

Hereinafter, the "volume A of pores having a diameter of 1 nm or more and 50 nm or less which is determined from the pore size distribution curve obtained by nitrogen gas adsorption before the silica particles are baked at 350° C." is referred to simply as "pore volume A before 350° C. baking".

Hereinafter, the "volume B of pores having a diameter of 1 nm or more and 50 nm or less which is determined from the pore size distribution curve obtained by nitrogen gas adsorption after the silica particles are baked at 350° C." is referred to simply as "pore volume B after 350° C. baking".

The above-described silica particles according to the exemplary embodiment may have a narrow charge distribution when being charged. The reasons are presumably as follows.

Since silica particles have high negative chargeability, they may be charged to an excessive degree. In such a case, the charge distribution of silica particles may become widened. In particular, in a low-temperature, low-humidity environment, the excessive charging is likely to occur and the likelihood of the widening of charge distribution is increased accordingly.

For example, in powder coating, powder paint charged by contact charging, corona discharge, or the like is sprayed to and electrostatically deposited on a material that is to be coated, and the resulting film is heated to form a coating film.

If silica particles that have a wide charge distribution when being charged are used as an external additive of the powder paint, inconsistencies in charging of the powder paint may occur and it becomes difficult to reduce variations in the amount of powder paint deposited on the material that is to be coated.

Adsorbing a nitrogen-containing compound onto silica particles reduces the likelihood of the silica particles being negatively charged to an excessive degree when being charged. Since a nitrogen-containing compound has positive chargeability, adsorbing a nitrogen-containing compound onto silica particles cancels out the excessive negative charge and prevents the silica particles from being negatively charged to an excessive degree.

However, adsorbing a nitrogen-containing compound, which has positive chargeability, onto the uppermost surfaces of silica particles disadvantageously results in widening of the charge distribution in both negative and positive charge zones. Therefore, the nitrogen-containing compound may be present in, for example, pores formed in the silica particles instead of covering the surfaces of the silica particles.

Thus, in the silica particles according to the exemplary embodiment, the pore volume A before 350° C. baking and the pore volume B after 350° C. baking are limited to satisfy the above-described relationships.

The pore volume B after 350° C. baking is the volume of pores of the silica particles which is measured after the nitrogen-containing compound adsorbed on the pores to block some of the pores has been removed by volatilization as a result of baking. Thus, limiting B/A to 1.2 or more and 5 or less and B to 0.2 cm$^3$/g or more and 3 cm$^3$/g or less means that the nitrogen-containing compound is adsorbed at least some of the pores of the silica particles in a sufficient amount. Therefore, in such a case, the charge distribution may become narrowed readily with the nitrogen-containing compound.

For the above reasons, it is considered that the silica particles according to the exemplary embodiment have a narrow charge distribution when being charged.

Furthermore, for example, when the silica particles according to the exemplary embodiment are used as an external additive of powder paint, inconsistencies in charging of the powder paint may be reduced even in a low-temperature, low-humidity environment and it becomes possible to reduce variations in the amount of powder paint deposited on the material that is to be coated.

In the silica particles according to the exemplary embodiment, the ratio of the integral C of a signal observed at a chemical shift of −50 ppm or more and −75 ppm or less in a $^{29}$Si solid-state nuclei magnetic resonance (NMR) spectrum (hereinafter, referred to simply as "Si-CP/MAS NMR spectrum") obtained by cross polarization/magic angle spinning (CP/MAS) to the integral D of a signal observed at a chemical shift of −90 ppm or more and −120 ppm or less in the $^{29}$Si solid-state NMR spectrum, that is, C/D, may be 0.10 or more and 0.75 or less.

When the integrals of the above signals of the silica particles according to the exemplary embodiment fall within the above ranges, the likelihood of the charge distribution being narrowed when the silica particles are charged is increased. The reasons are presumably as follows.

The integrals of the above signals of the silica particles falling within the above ranges means that a low-density structure (e.g., a $SiO_{2/3}CH_3$ layer) composed of the product of reaction of a trifunctional silane coupling agent, the structure including a sufficient amount of nitrogen-containing compound adsorbed thereon, is formed on at least a part of the surfaces of the silica particles. The structure composed of the product of reaction of a trifunctional silane coupling agent has a low density and pores onto which the nitrogen-containing compound can be readily adsorbed.

Furthermore, reducing the amount of OH groups, which inhibit the adsorption of the nitrogen-containing compound, enables a sufficient amount of nitrogen-containing compound to be readily adsorbed onto the structure composed of the product of reaction of a trifunctional silane coupling agent. This increases the amount of nitrogen-containing compound adsorbed.

Consequently, the charge distribution may become narrowed readily with the nitrogen-containing compound.

Details of the silica particles according to the exemplary embodiment are described below.

Pore Volume

In the silica particles according to the exemplary embodiment, the ratio of the pore volume B after 350° C. baking to the pore volume A before 350° C. baking, that is, B/A, is 1.2 or more and 5 or less. The ratio B/A is preferably 1.4 or more and 3 or less and is more preferably 1.4 or more and 2.5 or less in order to narrow the charge distribution.

The pore volume B after 350° C. baking is 0.2 cm$^3$/g or more and 3 cm$^3$/g or less. The pore volume B after 350° C. baking is preferably 0.3 cm$^3$/g or more and 1.8 cm$^3$/g or less and is more preferably 0.6 cm$^3$/g or more and 1.5 cm$^3$/g or less in order to narrow the charge distribution.

Specifically, the 350° C. baking is performed in the following manner.

In a nitrogen environment, the silica particles that are to be analyzed are heated to 350° C. at a heating rate of 10° C./min and subsequently held for 3 hours at 350° C. Then, the silica particles are cooled to room temperature (25° C.) at a cooling rate of 10° C./min.

The volume of pores is measured in the following manner.

First, the silica particles that are to be analyzed are cooled to the temperature (−196° C.) of liquid nitrogen, and a nitrogen gas is subsequently introduced. The amount of nitrogen gas adsorbed on the silica particles is determined by a constant-volume method or a weight method. While the pressure of the nitrogen gas introduced is gradually increased, the amount of the nitrogen gas adsorbed is plotted with respect to the equilibrium pressure to prepare an adsorption isotherm. On the basis of the adsorption isotherm, a pore size distribution curve with the horizontal and vertical axes representing pore diameter and frequency, respectively, is determined using the BJH equation.

On the basis of the pore size distribution curve, a cumulative pore volume distribution with the horizontal and vertical axes representing pore diameter and volume, respectively, is determined. On the basis of the cumulative pore volume distribution, the volume of pores having a diameter of 1 nm or more and 50 nm or less is calculated. This volume is considered "volumes of pores having a diameter of 1 nm or more and 50 nm or less".

CP/MAS NMR Spectrum

The ratio of the integral C of a signal observed at a chemical shift of −50 ppm or more and −75 ppm or less in the Si-CP/MAS NMR spectrum to the integral D of a signal observed at a chemical shift of −90 ppm or more and −120 ppm or less in the Si-CP/MAS NMR spectrum, that is, C/D, is 0.10 or more and 0.75 or less. The above C/D ratio is preferably 0.12 or more and 0.45 or less and is more preferably 0.15 or more and 0.40 or less in order to narrow the charge distribution.

The ratio (signal ratio) of the integral C of the signal observed at a chemical shift of −50 ppm or more and −75 ppm or less to the integral of all the signals included in the Si-CP/MAS NMR spectrum is preferably 5% or more and is more preferably 7% or more in order to narrow the charge distribution. The upper limit for the ratio of the signal integral C is set to, for example, 60% or less.

The Si-CP/MAS NMR spectrum can be measured by conducting a nuclear magnetic resonance spectrometric analysis under the following conditions.

Spectroscope: AVENCE300 produced by Bruker Corporation

Resonance frequency: 59.6 MHz

Nucleus measured: $^{29}$Si

Measurement method: CPMAS (Standard pulse sequence "cp.av" produced by Bruker Corporation)

Waiting time: 4 seconds

Contact time: 8 milliseconds

Cumulated number: 2,048

Measurement temperature: Room temperature (25° C.)

Observation center frequency: −3975.72 Hz

MAS rotation speed: 7.0 mm-6 kHz

Reference substance: Hexamethylcyclotrisiloxane

Structure of Silica Particles

The silica particles according to the exemplary embodiment include a nitrogen-containing compound.

Specifically, the silica particles according to the exemplary embodiment may include silica base particles and the product of reaction of a trifunctional silane coupling agent which covers at least a part of the surfaces of the silica base particles, the above reaction product including a nitrogen-containing compound adsorbed on at least a part of the reaction product. The above-described structure enables the above-described pore volume properties and the above-described Si-CP/MAS NMR spectrum properties to be readily controlled. Furthermore, the hydrophobicity and amount of OH groups, which are described below, can be readily controlled.

The silica particles according to the exemplary embodiment may include a hydrophobic treatment structure disposed on the surface of the above-described structure.

Silica Base Particles

The silica base particles are silica particles on at least a part of the surfaces of which the structure composed of the product of reaction of a trifunctional silane coupling agent, the structure including the nitrogen-containing compound adsorbed on at least a part of the pores of the product of reaction of the trifunctional silane coupling agent, is to be formed.

Examples of the silica base particles include dry-process silica particles and wet-process silica particles.

Examples of the dry-process silica particles include combustion-method silica (i.e., fumed silica) produced by combustion of a silane compound and deflagration-method silica produced by explosive combustion of a metal silicon powder.

Examples of the wet-process silica particles include wet-process silica particles produced by a neutralization reaction between sodium silicate and a mineral acid (e.g., sedimentation-method silica particles synthesized and aggregated under alkali conditions and gel-method silica particles synthesized and aggregated under acidic conditions), colloidal silica particles produced by converting acidic silicic acid into alkaline and then polymerizing the silicic acid (silica sol particles), and sol-gel method silica particles produced by hydrolysis of an organic silane compound, such as an alkoxysilane.

Among these silica base particles, the sol-gel method silica particles may be used in order to narrow the charge distribution.

Product of Reaction of Trifunctional Silane Coupling Agent

Since the adsorption structure composed of the product of reaction of a trifunctional silane coupling agent is a low-density structure having a high affinity for the nitrogen-containing compound, the nitrogen-containing compound may be readily adsorbed onto deep portions of the pores and, consequently, the amount (i.e., content) of the nitrogen-containing compound adsorbed may be increased. Depositing the nitrogen-containing compound having positive chargeability on the surfaces of the silica particles having negative chargeability cancels out the excessive negative charge. Moreover, since the nitrogen-containing compound is not adsorbed onto the uppermost surfaces of the silica particles but adsorbed onto the inside of the low-density structure, the risk of the charge distribution being widened due to excessively high positive chargeability is eliminated and only the excessive negative charge is canceled out. This may further narrow the charge distribution.

Examples of the product of reaction of a trifunctional silane coupling agent include a reaction product formed by replacing the $OR^2$ group in General Formula (TA) below with an OH group; a reaction product formed by polycondensation of compounds formed by replacing the $OR^2$ group in General Formula (TA) below with an OH group with each other; and a reaction product formed by polycondensation of a compound formed by replacing the $OR^2$ group in General Formula (TA) below with an OH group with the SiOH group of the silica particles. Note that the product of reaction of a trifunctional silane coupling agent may be a reaction product in which all or a part of the $OR^2$ groups are replaced with OH groups or a reaction product in which all or a part of the compounds are polycondensed.

The trifunctional silane coupling agent is a nitrogen-free compound that does not include nitrogen (N).

Specific examples of the trifunctional silane coupling agent include the trifunctional silane coupling agent represented by General Formula (TA) below.

$$R^1\text{—Si}(OR^2)_3 \hspace{2cm} (TA)$$

where $R^1$ represents a saturated or unsaturated aliphatic hydrocarbon group having 1 to 20 carbon atoms or an aromatic hydrocarbon group having 6 to 20 carbon atoms, and $R^2$ represents a halogen atom or an alkoxy group. The plural $R^2$ groups may be identical to or different from one another.

The aliphatic hydrocarbon group represented by $R^1$ may be linear, branched, or cyclic and is preferably linear or branched. The number of carbon atoms included in the aliphatic hydrocarbon group is preferably 1 to 20, is more preferably 1 to 18, is further preferably 1 to 12, and is particularly preferably 1 to 10. The aliphatic hydrocarbon group may be either saturated or unsaturated, is preferably a saturated aliphatic hydrocarbon group, and is more preferably an alkyl group.

Examples of the saturated aliphatic hydrocarbon group include linear alkyl groups, such as a methyl group, an ethyl group, a propyl group, a butyl group, a pentyl group, a hexyl group, a heptyl group, an octyl group, a nonyl group, a decyl group, a dodecyl group, a hexadecyl group, and an icosyl group; branched alkyl groups, such as an isopropyl group, an isobutyl group, an isopentyl group, a neopentyl group, a 2-ethylhexyl group, a tertiary butyl group, a tertiary pentyl group, and an isopentadecyl group; and cyclic alkyl groups, such as a cyclopropyl group, a cyclopentyl group, a cyclohexyl group, a cycloheptyl group, a cyclooctyl group, a tricyclodecyl group, a norbornyl group, and an adamantyl group.

Examples of the unsaturated aliphatic hydrocarbon group include alkenyl groups, such as a vinyl group (i.e., ethenyl group), a 1-propenyl group, a 2-propenyl group, a 2-butenyl group, a 1-butenyl group, a 1-hexenyl group, a 2-dodecenyl group, and a pentenyl group; and alkynyl groups, such as an ethynyl group, a 1-propynyl group, a 2-propynyl group, a 1-butynyl group, a 3-hexynyl group, and a 2-dodecynyl group.

The number of carbon atoms included in the aromatic hydrocarbon group represented by $R^1$ is preferably 6 to 20, is more preferably 6 to 18, is further preferably 6 to 12, and is particularly preferably 6 to 10.

Examples of the aromatic hydrocarbon group include a phenylene group, a biphenylene group, a terphenylene group, a naphthalene group, and an anthracene group.

Examples of the halogen atom represented by $R^2$ include a fluorine atom, a chlorine atom, a bromine atom, and an iodine atom. The halogen atom may be a chlorine atom, a bromine atom, or an iodine atom.

Examples of the alkoxy group represented by $R^2$ include an alkoxy group having 1 to 10 (preferably 1 to 8, more preferably 1 to 4) carbon atoms. Examples of the alkoxy group include a methoxy group, an ethoxy group, an iso-propoxy group, a t-butoxy group, an n-butoxy group, an n-hexyloxy group, a 2-ethylhexyloxy group, and a 3,5,5-trimethylhexyloxy group. The alkoxy group may be a substituted alkoxy group. Examples of the substituent that may be included in the alkoxy group include a halogen atom, a hydroxyl group, an amino group, an alkoxy group, an amide group, and a carbonyl group.

The trifunctional silane coupling agent represented by General Formula (TA) may be a trifunctional silane coupling agent with $R^1$ being a saturated aliphatic hydrocarbon group having 1 to 20 carbon atoms and $R^2$ being a halogen atom or an alkoxy group.

Examples of the Trifunctional Silane Coupling Agent Include:

compounds represented by General Formula (TA) with $R^1$ being an unsubstituted aliphatic hydrocarbon group or an unsubstituted aromatic hydrocarbon group, such as vinyltrimethoxysilane, methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, vinyltriethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, decyltrichlorosilane, and phenyltrichlorosilane; and compounds represented by General Formula (TA) with $R^1$ being a substituted aliphatic hydrocarbon group or a substituted aromatic hydrocarbon group, such as 3-glycidoxypropyltrimethoxysilane, γ-methacryloxypropyltrimethoxysilane, γ-mercaptopropyltrimethoxysilane, γ-chloropropyltrimethoxysilane, and γ-glycidyloxypropylmethyldimethoxysilane.

The above trifunctional silane coupling agents may be used alone or in combination of two or more.

Among these trifunctional silane coupling agents, in order to narrow the charge distribution, an alkyltrialkoxysilane is preferable, and an alkyltrialkoxysilane with $R^1$ being an alkyl group having 1 to 20 (preferably 1 to 15) carbon atoms and $R^2$ being an alkyl group having 1 or 2 carbon atoms is more preferable.

The amount of the structure composed of the product of reaction of the trifunctional silane coupling agent which is deposited on the silica base particles is preferably 5.5% by mass or more and 30% by mass or less and is more preferably 7% by mass or more and 22% by mass or less of the amount of the silica particles in order to narrow the charge distribution.

Nitrogen-Containing Compound

The term "nitrogen-containing compound" used herein refers to a nitrogen-containing compound other than ammonia or a compound that is gaseous at −200° C. or more and 25° C. or less.

The nitrogen-containing compound may be adsorbed onto at least a part of the pores of the product of reaction of the trifunctional silane coupling agent.

The nitrogen-containing compound may be, for example, at least one selected from the group consisting of a quaternary ammonium salt, a primary amine, a secondary amine, a tertiary amine, an amide, an imine, and a nitrile.

Examples of the primary amine include phenethylamine, toluidine, catecholamine, and 2,4,6-trimethylaniline.

Examples of the secondary amine include dibenzylamine, 2-nitrodiphenylamine, and 4-(2-octylamino)diphenylamine.

Examples of the tertiary amine include 1,8-bis(dimethylamino)naphthalene, N,N-dibenzyl-2-aminoethanol, and N-benzyl-N-methylethanolamine.

Examples of the amide include N-cyclohexyl-p-toluenesulfonamide, 4-acetamido-1-benzylpiperidine, and N-hydroxy-3-[1-(phenylthio)methyl-1H-1,2,3-triazol-4-yl]benzamide.

Examples of the imine include diphenylmethaneimine, 2,3-bis(2,6-diisopropylphenylimino)butane, and N,N'-(ethane-1,2-diylidene)bis(2,4,6-trimethylaniline).

Examples of the nitrile include 3-indoleacetonitrile, 4-[(4-chloro-2-pyrimidinyl)amino]benzonitrile, and 4-bromo-2,2-diphenylbutyronitrile.

Among the above nitrogen-containing compounds, a quaternary ammonium salt may be used in order to narrow the charge distribution.

Quaternary ammonium salts may be used alone or in combination of two or more.

The quaternary ammonium salt is not limited; the quaternary ammonium salts known in the related art may be used.

The quaternary ammonium salt may include the compound represented by General Formula (AM) below in order to narrow the charge distribution. Compounds represented by General Formula (AM) may be used alone or in combination of two or more.

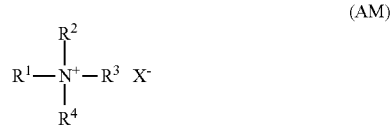

(AM)

In General Formula (AM), $R^1$, $R^2$, $R^3$, and $R^4$ each independently represent a hydrogen atom or an alkyl, aralkyl, or aryl group that may include a substituent; and $X^-$ represents an anion. At least one of the $R^1$, $R^2$, $R^3$, and $R^4$ represents an alkyl, aralkyl, or aryl group that may include a substituent. Two or more of the $R^1$, $R^2$, $R^3$, and $R^4$ may be joined to one another to form an aliphatic, aromatic, or hetero ring.

Examples of the alkyl groups represented by $R^1$ to $R^4$ include a linear alkyl group having 1 to 20 carbon atoms and a branched alkyl group having 3 to 20 carbon atoms.

Examples of the linear alkyl group having 1 to 20 carbon atoms include a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, and an n-hexadecyl group.

Examples of the branched alkyl group having 3 to 20 carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, and a tert-decyl group.

Among these, alkyl groups having 1 to 15 carbon atoms, such as a methyl group, an ethyl group, a butyl group, and a tetradecyl group, may be used as alkyl groups represented by $R^1$ to $R^4$.

Examples of the aralkyl group represented by $R^1$ to $R^4$ include an aralkyl group having 7 to 30 carbon atoms.

Examples of the aralkyl group having 7 to 30 carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthrathylmethyl group, and a phenyl-cyclopentylmethyl group.

Among these, aralkyl groups having 7 to 15 carbon atoms, such as a benzyl group, a phenylethyl group, a phenylpropyl group, and a 4-phenylbutyl group, may be used as aralkyl groups represented by $R^1$ to $R^4$.

Examples of the aryl group represented by $R^1$ to $R^4$ include an aryl group having 6 to 20 carbon atoms.

Examples of the aryl group having 6 to 20 carbon atoms include a phenyl group, a pyridyl group, and a naphthyl group.

Among these, aryl groups having 6 to 10 carbon atoms, such as a phenyl group, may be used as aryl groups represented by $R^1$ to $R^4$.

Examples of the anion represented by $X^-$ include an organic anion and an inorganic anion.

Examples of the organic anion include a polyfluoroalkylsulfonate ion, a polyfluoroalkylcarboxylate ion, a tetraphenylborate ion, an aromatic carboxylate ion, and an aromatic sulfonate ion, such as a 1-naphthol-4-sulfonate ion.

Examples of the inorganic anion include molybdate ions, such as $MoO_4^{2-}$, $Mo_2O_7^{2-}$, $Mo_3O_{10}^{2-}$, $Mo_4O_{13}^{2-}$, $Mo_7O_{24}^{2-}$, and $Mo_8O_{26}^{4-}$, $OH^-$, $F^-$, $Fe(CN)_6^{3-}$, $Cl^-$, $Br^-$, $NO_2^-$, $NO_3^-$, $CO_3^{2-}$, $PO_4^{3-}$, and $SO_4^{2-}$.

Two or more of the $R^1$, $R^2$, $R^3$, and $R^4$ in General Formula (AM) may be joined to one another to form a ring. Examples of the ring formed by two or more of the $R^1$, $R^2$, $R^3$, and $R^4$ being joined to one another include an aliphatic ring having 2 to 20 carbon atoms and a heterocyclic amine having 2 to 20 carbon atoms.

In the compound represented by General Formula (AM), $R^1$, $R^2$, $R^3$, and $R^4$ may each independently include a substituent.

Examples of the substituent include a nitrile group, a carbonyl group, an ether group, an amide group, a siloxane group, a silyl group, and a silanealkoxy group.

$R^1$, $R^2$, $R^3$, and $R^4$ may each independently represent an alkyl group having 1 to 16 carbon atoms, an aralkyl group having 7 to 10 carbon atoms, or an aryl group having 6 to 20 carbon atoms.

Among these, the total number of carbon atoms included in the compound represented by General Formula (AM) is preferably 18 to 35 and is more preferably 20 to 32 in order to narrow the charge distribution.

Examples of the structure of the compound represented by General Formula (AN) which is other than $X^-$ are as follows. Note that the exemplary embodiment is not limited to the following examples.

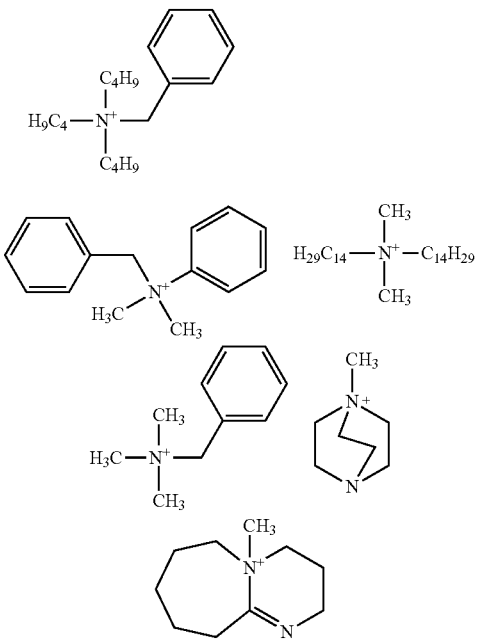

In order to narrow the charge distribution and maintain the charge distribution, the nitrogen-containing compound is preferably a nitrogen-containing compound including molybdenum and is more preferably at least one selected from the group consisting of a quaternary ammonium salt including molybdenum (specifically, a salt of quaternary ammonium which includes molybdenum) and a mixture of a quaternary ammonium salt with a metal oxide including molybdenum.

When the nitrogen-containing compound includes molybdenum, the activity of nitrogen is enhanced and, consequently, the positive chargeability of nitrogen can be produced at an adequate level even when the nitrogen-containing compound is present not on the uppermost surfaces of the silica particles but inside of the pores. This enables the silica particles to have a narrow charge distribution when being charged. Furthermore, the retention of the charge distribution may be readily enhanced.

A salt of quaternary ammonium salt which includes molybdenum particularly enhances the retention of the charge distribution because the anion including molybdenum strongly bonds to the quaternary ammonium cation.

Examples of the quaternary ammonium salt including molybdenum include $[N^+(CH)_3(C_{14}C_{29})_2]_4Mo_8O_{28}^{4-}$, $[N^+(C_4H_9)_2(C_6H_6)_2]_2Mo_2O_7^{2-}$, $[N^+(CH_3)_2 (CH_2C_6H_6) (CH_2)_{17} CH_3]_2MoO_4^{2-}$, and $[N^+(CH_3)_2 (CH_2C_6H_6) (CH_2)_{15}CH_3]_2 MoO_4^{2-}$.

Examples of the metal oxide including molybdenum include molybdenum oxides, such as molybdenum trioxide, molybdenum dioxide, and $Mo_9O_{26}$; alkali metal salts of molybdenum acid, such as lithium molybdate, sodium molybdate, and potassium molybdate; alkaline-earth metal salts of molybdenum acid, such as magnesium molybdate and calcium molybdate; and complex oxides, such as $Bi_2O_3 \cdot 2MoO_3$ and $\gamma\text{-}Ce_2Mo_3O_{13}$.

Detection and Content of Nitrogen-Containing Compound

The nitrogen-containing compound can be detected when the silica particles according to the exemplary embodiment are heated in the temperature range of 300° C. or more and 600° C. or less. Specifically, the nitrogen-containing compound can be detected, for example, in the following manner.

In the detection of the nitrogen-containing compound, for example, a heating furnace-type free-fall pyrolysis gas chromatograph mass spectrometer that uses He as a carrier gas is used. The nitrogen-containing compound can be detected under a pyrolysis temperature condition of 300° C. or more and 600° C. or less in an inert gas. Specifically, 0.1 mg or more and 10 mg or less of the silica particles are introduced to the pyrolysis gas chromatograph mass spectrometer. Whether the silica particles include the nitrogen-containing compound can be determined from the mass spectrum of the detected peak. Examples of the component produced by the pyrolysis of the silica particles including the nitrogen-containing compound include a primary, secondary, or tertiary amine and an aromatic nitrogen compound which are represented by General Formula (N) below.

In General Formula (N) below, $R^{N1}$ to $R^{N3}$ each independently represent a hydrogen atom or an alkyl, aralkyl, or aryl group that may include a substituent. Note that $R^{N1}$, $R^{N2}$, and $R^{N3}$ represent the same things as $R^1$, $R^2$, and $R^3$ in General Formula (AM), respectively.

For example, in the case where the nitrogen-containing compound is a quaternary ammonium salt, a part of the side chains are desorbed as a result of pyrolysis at 600° C., and the nitrogen-containing compound is detected as a tertiary amine.

(N)

The content of the nitrogen-containing compound is preferably 0.008% by mass or more and 0.45% by mass or less, is more preferably 0.015% by mass or more and 0.20% by mass or less, and is further preferably 0.018% by mass or more and 0.10% by mass or less of the amount of the silica particles in terms of nitrogen atoms in order to narrow the charge distribution.

The content of the nitrogen-containing compound in terms of nitrogen atoms is measured in the following manner.

The abundance of nitrogen is measured in terms of the proportion of nitrogen (N/Si) with an oxygen/nitrogen analyzer, such as "EMGA-920" produced by HORIBA, Ltd. at an integration time of 45 seconds. As a pretreatment, the sample is dried in a vacuum dryer at 100° C. for 24 hours or more in order to remove impurities, such as ammonia, from the silica particles.

In the case where the nitrogen-containing compound including molybdenum is used as a nitrogen-containing compound, the ratio of the net intensity of molybdenum to the net intensity of silicon which are determined by X-ray fluorescence analysis, that is, Mo/Si, is preferably 0.035 or more and 0.35 or less, is more preferably 0.07 or more and 0.32 or less, and is further preferably 0.10 or more and 0.30 or less in order to narrow the charge distribution.

The net intensity of molybdenum is preferably 5 kcps or more and 75 kcps or less, is more preferably 7 kcps or more and 50 kcps or less, is further preferably 8 kcps or more and 55 kcps or less, and is particularly preferably 10 kcps or more and 40 kcps or less in order to narrow the charge distribution.

The net intensities of molybdenum and silicon are measured in the following manner.

About 0.5 g of the silica particles are compressed with a compression molding machine at a load of 6 t for 60 seconds to form a disc having a diameter of 50 mm and a thickness of 2 mm. Using the disc as a sample, a qualitative and quantitative element analysis is conducted with a scanning X-ray fluorescence analyzer "XRF-1500" produced by Shimadzu Corporation under the following conditions in order to determine the net intensities of molybdenum and silicon (units: kilo counts per second, kcps).

Tube voltage: 40 kV
Tube current: 90 mA
Measurement area (analysis diameter): 10 mm
Measurement time: 30 minutes
Anticathode: Rhodium Amount of Nitrogen-Containing Compound Extracted The amount X of the nitrogen-containing compound extracted with a mixed solution of ammonia and methanol is 0.1% by mass or more. The amount X of the nitrogen-containing compound extracted and the amount Y of the nitrogen-containing compound extracted with water may satisfy Y/X<0.3.

That is, the nitrogen-containing compound is poorly soluble in water. In other words, the nitrogen-containing compound hardly adsorbs moisture contained in the air.

In the silica particles including the nitrogen-containing compound, if the nitrogen-containing compound adsorbs moisture, the charge distribution of the silica particles may become widened. In addition, the likelihood of the nitrogen-containing compound desorbing from the silica particles is increased.

In contrast, when the silica particles include a nitrogen-containing compound that hardly adsorbs moisture contained in the air, the likelihood of widening of the charge distribution is low, the likelihood of the nitrogen-containing compound desorbing from the silica particles is low, and a narrow charge distribution may be readily maintained, even in the case where the air has a high moisture content (i.e., even at high humidity).

The amount X of the nitrogen-containing compound extracted may be 50% by mass or more. However, the upper limit for the amount X of the nitrogen-containing compound extracted is set to, for example, 95% by mass or less because the solution cannot easily penetrate inside of the pores due to surface tension and, therefore, a part of the nitrogen-containing compound remains undissolved.

The ratio Y/X of the amount Y of the nitrogen-containing compound extracted to the amount X of the nitrogen-containing compound extracted is preferably less than 0.3 and is more preferably 0.15 or less. The lower limit for the ratio Y/X is ideally 0 but is actually, for example, 0.01 or more, because a possible error range of measurement of X and Y is about ±1%.

The amounts X and Y of the nitrogen-containing compound extracted can be measured in the following manner.

First, the silica particles are analyzed with a thermogravimetry mass spectrometer (e.g., gas chromatograph mass spectrometer produced by NETZSCH Japan K.K.) at a constant temperature of 400° C. in order to measure the integral of the mass fraction of a compound including a nitrogen atom and a hydrocarbon having 1 or more carbon atoms which is covalently bonded to the nitrogen atom to the silica particles as W1.

To 30 parts by mass of an ammonia/methanol mixed solution (produced by Sigma-Aldrich, ammonia/methanol mass ratio=1/5.2) having a liquid temperature of 25° C., 1 part by mass of the silica particles that are to be analyzed are added. After an ultrasonic wave treatment has been performed for 30 minutes, the silica powder and the extract are separated from each other. The separated silica particles are dried in a vacuum dryer at 100° C. for 24 hours and then analyzed with the thermogravimetry mass spectrometer at a constant temperature of 400° C. in order to measure the mass fraction of a compound including a nitrogen atom and a hydrocarbon having 1 or more carbon atoms which is covalently bonded to the nitrogen atom to the silica particles as W2.

The amount X of the nitrogen-containing compound extracted can be calculated using the following formula.

$$X = W1 - W2$$

To 30 parts by mass of water having a liquid temperature of 25° C., 1 part by mass of the silica particles that are to be analyzed are added. After an ultrasonic wave treatment has been performed for 30 minutes, the silica particles and the extract are separated from each other. The separated silica particles are dried in a vacuum dryer at 100° C. for 24 hours and then analyzed with the thermogravimetry mass spectrometer at a constant temperature of 400° C. in order to measure the mass fraction of a compound including a nitrogen atom and a hydrocarbon having 1 or more carbon atoms which is covalently bonded to the nitrogen atom to the silica particles as W3.

The amount Y of the nitrogen-containing compound extracted can be calculated using the following formula.

$$Y = W1 - W3$$

Hydrophobic Treatment Structure

The hydrophobic treatment structure is a structure formed by the reaction of a hydrophobizing agent.

Examples of the hydrophobizing agent include an organosilicon compound.

Examples of the organosilicon compound include:
alkoxysilanes and halosilanes including a lower alkyl group, such as methyltrimethoxysilane, dimethyldimethoxysilane, trimethylchlorosilane, and trimethylmethoxysilane;
alkoxysilanes including a vinyl group, such as vinyltrimethoxysilane and vinyltriethoxysilane;
alkoxysilanes including an epoxy group, such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane;
alkoxysilanes including a styryl group, such as p-styryltrimethoxysilane and p-styryltriethoxysilane;
alkoxysilanes including an aminoalkyl group, such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethylbutylidene)propylamine, and N-phenyl-3-aminopropyltrimethoxysilane;
alkoxysilanes including an isocyanatoalkyl group, such as 3-isocyanatopropyltrimethoxysilane and 3-isocyanatopropyltriethoxysilane; and
silazanes, such as hexamethyldisilazane and tetramethyldisilazane.

Properties of Silica Particles

Hydrophobicity

The hydrophobicity of the silica particles according to the exemplary embodiment is preferably 10% or more and 60% or less, is more preferably 20% or more and 55% or less, and is further preferably 28% or more and 53% or less in order to narrow the charge distribution.

If the hydrophobicity of the silica particles is less than 10%, the amount of the coating structure formed by the reaction of the trifunctional silane coupling agent is small and, consequently, the content of the nitrogen-containing compound is reduced. This increases the likelihood of widening of the charge distribution.

If the hydrophobicity of the silica particles is more than 60%, the density of the structure formed by the reaction of the trifunctional silane coupling agent is increased, the amount of the pores is reduced, and, consequently, the content of the nitrogen-containing compound is reduced. This increases the likelihood of widening of the charge distribution.

The hydrophobicity of the silica particles is measured in the following manner.

To 50 ml of ion-exchange water, 0.2% by mass of a sample, that is, the silica particles, is added. While the resulting mixture is stirred with a magnetic stirrer, methanol is added dropwise to the mixture with a buret. At the endpoint at which the whole amount of the sample has been settled, the mass fraction of methanol in the mixed solution of methanol and water is determined as a hydrophobicity.

Number Average Particle Size and Number Particle Size Distribution Index

The number average size of the silica particles according to the exemplary embodiment is preferably 10 nm or more and 200 nm or less, is more preferably 10 nm or more and 80 nm or less, and is further preferably 10 nm or more and 60 nm or less.

When the number average size of silica particles falls within the above range, the silica particles have a large specific surface area and, consequently, are likely to be charged to an excessive degree. In contrast, although the number average size of the silica particles according to the exemplary embodiment falls within the above range, the charge distribution of the silica particles according to the exemplary embodiment may become narrowed.

The number particle size distribution index of the silica particles according to the exemplary embodiment is preferably 1.1 or more and 2.0 or less and is more preferably 1.15 or more and 1.6 or less.

When the number particle size distribution index of the silica particles according to the exemplary embodiment falls within the above range, the amounts of coarse powder particles, which are likely to be charged in large amounts, and fine powder particles, which are likely to be charged in small amounts, are reduced and, consequently, the charge distribution may become narrowed readily.

The number average size and number particle size distribution index of the silica particles are determined in the following manner.

The silica particles are inspected with a scanning electron microscope (SEM) at a 40,000-fold magnification. An image of the silica particles is analyzed with image processing and analysis software "WinRoof" produced by Mitani Corporation in order to calculate the equivalent circle diameters of at least 200 silica particles. In ascending order in terms of particle diameter, the cumulative number is calculated and plotted to draw a cumulative distribution curve. The particle size at which the cumulative number reaches 50% is considered the number average particle size.

The square root of the quotient of the particle size D84 at which the cumulative number reaches 84% divided by the particle size D16 at which the cumulative number reaches 16% is defined as "number particle size distribution index (GSD)". That is, the number particle size distribution index (GSD) is calculated as $(D84/D16)^{0.5}$.

Circularity

The average circularity of the silica particles according to the exemplary embodiment is preferably 0.60 or more and 0.96 or less, is more preferably 0.70 or more and 0.92 or less, and is further preferably 0.75 or more and 0.90 or less.

When the average circularity of silica particles falls within the above range, the silica particles have a large specific surface area and, consequently, are likely to be charged to an excessive degree. In contrast, although the average circularity of the silica particles according to the exemplary embodiment falls within the above range, the charge distribution of the silica particles may become narrowed.

The circularity of the silica particles is determined in the following manner.

The silica particles are inspected with a scanning electron microscope (SEM) at a 40,000-fold magnification. An image of the silica particles is analyzed with image processing and analysis software "WinRoof" produced by Mitani Corporation in order to calculate the circularities of at least 200 silica particles. The average circularity is calculated by taking the arithmetic average thereof.

Circularity is calculated using the following formula.

Circularity=[Perimeter of equivalent circle]/[Perimeter]=$[2 \times (A\pi)^{1/2}]$/PM where A represents projected area, and PM represents perimeter.

Volume Resistivity

The volume resistivity (specifically, volume resistivity before 350° C. baking) of the silica particles according to the exemplary embodiment is preferably $1.0 \times 10^7$ Ω·cm or more and $1.0 \times 10^{11.5}$ Ω·cm or less and is more preferably $1.0 \times 10^8$ Ω·cm or more and $1.0 \times 10^{11}$ Ω·cm or less.

When the volume resistivity of the silica particles according to the exemplary embodiment falls within the above range, the content of the nitrogen-containing compound is high, the occurrence of the excessive charging may be reduced, and the charge distribution may become narrowed readily.

When the volume resistivity values of the silica particles according to the exemplary embodiment which are measured before and after the 350° C. baking are defined as Ra and Rb, respectively, Ra/Rb is preferably 0.01 or more and 0.8 or less and is more preferably 0.015 or more and 0.6 or less.

When Ra/Rb falls within the above range, the content of the nitrogen-containing compound is high, the occurrence of the excessive charging may be reduced, and the charge distribution may become narrowed readily.

The 350° C. baking is performed as described above.

Volume resistivity is measured in the following manner. Note that the following measurement is conducted at a temperature of 20° C. and a humidity of 50% RH.

The silica particles that are to be analyzed are placed on the surface of a circular fixture provided with a 20 cm²-electrode plate so as to form a layer having a thickness of about 1 mm or more and 3 mm or less. Hereby, a silica particle layer is formed. Another 20 cm²-electrode plate similar to the above electrode plate is placed on the silica particle layer such that the silica particle layer is interposed between the two electrode plates. A pressure of 0.4 MPa is applied to the electrode plate disposed above the silica particle layer in order to eliminate the gaps between the silica particles. Then, the thickness (cm) of the silica particle layer is measured. The two electrodes disposed above and below the silica particle layer are both connected to an impedance analyzer produced by Solartron Analytical. The measurement is conducted at a frequency of $10^{-3}$ Hz or more and $10^6$ Hz or less to obtain a Nyquist plot.

On the assumption of existence of three resistance components, that is, bulk resistance, particle interface resistance, and electrode contact resistance, the above plot is fit to an equivalent circuit to determine bulk resistance R.

The volume resistivity (Ω·cm) of the silica particles is calculated using the following formula.

$\rho = R/L$ wherein $\rho$ represents the volume resistivity (Ω·cm) of the silica particles, R represents bulk resistance (Ω), and L represents the thickness (cm) of the silica particle layer.

Amount of OH Groups

The amount of OH groups included in the silica particles according to the exemplary embodiment which is measured by the Sears method is preferably 0.2 groups/nm² or more and 5.5 groups/nm² or less. In order to narrow the charge distribution, the amount of the above OH groups is more preferably 0.2 groups/nm² or more and 4 groups/nm² or less and is further preferably 0.2 groups/nm² or more and 3 groups/nm² or less.

The amount of OH groups measured by the Sears method may be adjusted to fall within the above range by forming the structure composed of the product of reaction of the trifunctional silane coupling agent on the silica base particles in a sufficient amount.

Reducing the amount of OH groups, which inhibit the adsorption of the nitrogen-containing compound, to fall within the above range enables the nitrogen-containing compound to easily penetrate deep into the pores of the silica particles (e.g., the pores of the adsorption layer described below). Consequently, hydrophobic interactions act on the nitrogen-containing compound, and the adhesion of the nitrogen-containing compound to the silica particles is increased. This increases the amount of the nitrogen-containing compound adsorbed. In addition, the likelihood of the nitrogen-containing compound desorbing from the silica particles is reduced. As a result, the charge distribution may become further narrowed with the nitrogen-containing compound, and the retention of the narrow charge distribution may be enhanced.

Reducing the amount of OH groups to the above range also reduces the degree of environmental dependence of charging characteristics and consequently enables the charge distribution to become narrowed readily with the nitrogen-containing compound in any environment (in particular, a low-temperature, low-humidity environment in which the silica particles are likely to be negatively charged to an excessive degree).

The amount of OH groups is measured by the Sears method. Specific details thereof are as follows.

To a liquid mixture including 50 g of pure water and 50 g of ethanol, 1.5 g of the silica particles are added. The resulting mixture is stirred for 2 minutes with an ultrasonic homogenizer to form a dispersion liquid. While the dispersion liquid is stirred at 25° C., 1.0 g of a 0.1 mol/L-aqueous hydrochloric acid solution is added dropwise to the dispersion liquid. Hereby, a test liquid is prepared. The test liquid is charged into an automatic titrator, and potentiometric titration is conducted using a 0.01 mol/L-aqueous sodium hydroxide solution in order to prepare a differential titration curve. The maximum of the amounts of the 0.01 mol/L-aqueous sodium hydroxide solution used for titration at the inflection points at which the derivative of the titration curve is 1.8 or more is defined as E.

The density $\rho$ (groups/nm$^2$) of silanol groups present on the surfaces of the silica particles is calculated using the following formula.

$$\rho=((0.01 \times E-0.1) \times NA/1000)/(M \times S_{BET} \times 10^{18})$$

Details of the symbols used in the above formula are as follows.

E: the maximum of the amounts of the 0.01 mol/L-aqueous sodium hydroxide solution used for titration at the inflection points at which the derivative of the titration curve is 1.8 or more NA: Avogadro's number M: Amount of silica particles (1.5 g)

$S_{BET}$: specific surface area (m$^2$/g) of the silica particles

The specific surface area of the silica particles is measured by the BET nitrogen adsorption three-point method. The equilibrium relative pressure is set to 0.3.

Method for Producing Silica Particles

An example of the method for producing the silica particles according to the exemplary embodiment includes:
a first step of forming a structure composed of the product of reaction of the trifunctional silane coupling agent on at least a part of the surfaces of the silica base particles; and
a second step of adsorbing the nitrogen-containing compound onto at least a part of pores of the product of reaction of the trifunctional silane coupling agent.

The method for producing the silica particles according to the exemplary embodiment may further include a third step of, in or after the second step, performing a hydrophobic treatment of the silica base particles that include the structure covering at least a part of the surfaces of the silica base particles, the structure being composed of the product of reaction of the trifunctional silane coupling agent, the structure including the nitrogen-containing compound adsorbed on at least a part of pores of the product of reaction of the trifunctional silane coupling agent.

Details of each of the steps of the method for producing the silica particles according to the exemplary embodiment are described below.

Preparation Step

First, a step of preparing the silica base particles is described below.

Examples of the Preparation Step Include (i) a step of mixing a solvent including an alcohol with silica base particles to prepare a suspension of the silica base particles; and (ii) a step of granulating silica base particles by a sol-gel method to form a suspension of the silica base particles.

Examples of the silica base particles used in the preparation step (i) include sol-gel silica particles (i.e., silica particles prepared by a sol-gel method), aqueous colloidal silica particles, alcoholic silica particles, fumed silica particles prepared by a gas-phase method, and fused silica particles.

The solvent including an alcohol which is used in the preparation step (i) may be a solvent composed only of an alcohol or a mixed solvent of an alcohol and a solvent other than an alcohol. Examples of the alcohol include lower alcohols, such as methanol, ethanol, n-propanol, isopropanol, and butanol. Examples of the other solvent include water; ketones, such as acetone, methyl ethyl ketone, and methyl isobutyl ketone; cellosolves, such as methyl cellosolve, ethyl cellosolve, butyl cellosolve, and cellosolve acetate; and ethers, such as dioxane and tetrahydrofuran. The proportion of the alcohol in the mixed solvent is preferably 80% by mass or more and is more preferably 85% by mass or more.

The preparation step may be a step of granulating silica base particles by a sol-gel method to form a suspension of the silica base particles.

Specifically, the preparation step may be, for example, a sol-gel method including:
an alkali catalyst solution preparation step of preparing an alkali catalyst solution that includes a solvent including an alcohol and an alkali catalyst added to the solvent; and
a silica base particle formation step of feeding a tetraalkoxysilane and an alkali catalyst to the alkali catalyst solution in order to form silica base particles.

The alkali catalyst solution preparation step may be a step of preparing a solvent including an alcohol and mixing the solvent with an alkali catalyst to prepare an alkali catalyst solution.

The solvent including an alcohol may be a solvent composed only of an alcohol or a mixed solvent of an alcohol and a solvent other than an alcohol. Examples of the alcohol include lower alcohols, such as methanol, ethanol, n-propanol, isopropanol, and butanol. Examples of the other solvent include water; ketones, such as acetone, methyl ethyl ketone, and methyl isobutyl ketone; cellosolves, such as methyl cellosolve, ethyl cellosolve, butyl cellosolve, and cellosolve acetate; and ethers, such as dioxane and tetrahydrofuran. The proportion of the alcohol in the mixed solvent is preferably 80% by mass or more and is more preferably 85% by mass or more.

The alkali catalyst is a catalyst used for facilitating the reaction (i.e., hydrolysis and condensation) of the tetraalkoxysilane. Examples of the alkali catalyst include basic catalysts, such as ammonia, urea, and monoamines. In particular, ammonia may be used.

The concentration of the alkali catalyst in the alkali catalyst solution is preferably 0.5 mol/L or more and 1.5 mol/L or less, is more preferably 0.6 mol/L or more and 1.2 mol/L or less, and is further preferably 0.65 mol/L or more and 1.1 mol/L or less.

The silica base particle formation step is a step of feeding a tetraalkoxysilane and an alkali catalyst to the alkali catalyst solution and causing the reaction (i.e., hydrolysis and condensation) of the tetraalkoxysilane in the alkali catalyst solution to form silica base particles.

In the silica base particle formation step, core particles are formed by the reaction of the tetraalkoxysilane in early stages of feeding of the tetraalkoxysilane (i.e., core particle formation stage) and the core particles are grown to silica base particles (i.e., core particle growth stage).

Examples of the tetraalkoxysilane include tetramethoxysilane, tetraethoxysilane, tetrapropoxysilane, and tetrabutoxysilane. The tetraalkoxysilane may be tetramethoxysilane or tetraethoxysilane in consideration of ease of control of reaction velocity and the uniformity of shape of the resulting silica base particles.

Examples of the alkali catalyst fed to the alkali catalyst solution include basic catalysts, such as ammonia, urea, monoamines, and quaternary ammonium salts. In particular, ammonia may be used. The type of the alkali catalyst fed to the alkali catalyst solution together with the tetraalkoxysilane may be the same as or different from the type of the alkali catalyst originally included in the alkali catalyst solution. It is preferable that the types of the above alkali catalysts be the same as each other.

The tetraalkoxysilane and the alkali catalyst may be fed to the alkali catalyst solution in a continuous or intermittent manner.

In the silica base particle formation step, the temperature of the alkali catalyst solution, that is, the temperature of the alkali catalyst solution to which the tetraalkoxysilane and the alkali catalyst are fed, is preferably 5° C. or more and 50° C. or less and is more preferably 15° C. or more and 45° C. or less.

First Step

In the first step, the structure composed of the product of reaction of the trifunctional silane coupling agent is formed.

Specifically, in the first step, for example, the trifunctional silane coupling agent is added to the suspension of the silica base particles in order to cause the trifunctional silane coupling agent to react with the surfaces of the silica base particles and form a structure composed of the product of reaction of the trifunctional silane coupling agent. The trifunctional silane coupling agent forms the structure composed of the product of reaction of the trifunctional silane coupling agent as a result of the reaction between the functional groups of the trifunctional silane coupling agent or the reaction between the functional groups of the trifunctional silane coupling agent and the OH groups present in the surfaces of the silica particles.

The reaction of the trifunctional silane coupling agent can be conducted by adding the trifunctional silane coupling agent to the suspension of the silica base particles and subsequently heating the suspension while stirring the suspension.

Specifically, for example, the above suspension is heated to 40° C. or more and 70° C. or less, the trifunctional silane coupling agent is subsequently added to the suspension, and the resulting mixture is then stirred. The amount of time during which the stirring is continued is preferably 10 minutes or more and 24 hours or less, is more preferably 60 minutes or more and 420 minutes or less, and is further preferably 80 minutes or more and 300 minutes or less.

Second Step

In the second step, the nitrogen-containing compound is adsorbed onto at least a part of the pores of the product of reaction of the trifunctional silane coupling agent.

Specifically, in the second step, first, for example, the nitrogen-containing compound is added to the suspension of the silica base particles, and the resulting mixture is stirred at, for example, 20° C. or more and 50° C. or less. This causes the nitrogen-containing compound to adsorb onto at least a part of the pores of the product of reaction of the trifunctional silane coupling agent.

In the second step, for example, an alcohol liquid that includes the nitrogen-containing compound may be added to the suspension of the silica base particles.

The type of the above alcohol may be the same as or different from the type of the alcohol originally included in the suspension of the silica base particle. It is preferable that the types of the two alcohols are the same as each other.

The concentration of the nitrogen-containing compound in the alcohol liquid including the nitrogen-containing compound is preferably 0.05% by mass or more and 10% by mass or less and is more preferably 0.1% by mass or more and 6% by mass or less.

Third Step

In the third step, a hydrophobic treatment of the silica base particles that include the structure including the nitrogen-containing compound adsorbed on at least a part of the pores of the product of reaction of the trifunctional silane coupling agent is performed in or after the second step.

Specifically, in the third step, for example, after the nitrogen-containing compound has been added to the suspension of the silica base particles that include the above structure formed thereon, a hydrophobizing agent is added to the suspension.

The hydrophobizing agent forms a hydrophobic treatment layer as a result of the reaction between the functional groups of the hydrophobizing agent or the reaction between the functional groups of the hydrophobizing agent and the OH groups of the silica base particles.

The reaction of the hydrophobizing agent can be conducted by adding the hydrophobizing agent to the suspension of the silica base particles and subsequently heating the suspension while stirring the suspension.

Specifically, for example, the above suspension is heated to 40° C. or more and 70° C. or less, the hydrophobizing agent is subsequently added to the suspension, and the resulting mixture is then stirred. The amount of time during which the stirring is continued is preferably 10 minutes or more and 24 hours or less, is more preferably 20 minutes or more and 120 minutes or less, and is further preferably 20 minutes or more and 90 minutes or less.

Drying Step

The method for producing the silica particles according to the exemplary embodiment may further include a drying step of removing the solvent from the suspension subsequent to the second or third step. The drying step may be conducted in the second or third step.

Examples of the drying method include heat drying, spray drying, and supercritical drying.

Spray drying may be performed by any of the methods known in the related art with a commercial spray dryer (e.g., rotary disc spray dryer or nozzle spray dryer).

Spray drying may be performed by, for example, spraying a spray liquid into a hot-air stream at a rate of 0.2 L/hr or more and 1 L/hr or less. The temperature of the hot air is preferably 70° C. or more and 400° C. or less at the inlet and is preferably 40° C. or more and 120° C. or less at the outlet. If the inlet temperature is less than 70° C., the solid component of the dispersion liquid may fail to be dried to a sufficient degree. If the inlet temperature exceeds 400° C., the particle shape may become deformed during the spray drying. If the outlet temperature is less than 40° C., the solid component may fail to be dried to a sufficient degree and adhere to the inside of the device. The inlet temperature is more preferably 100° C. or more and 300° C. or less.

The concentration of the solid component of the silica particles in the silica particle suspension that is subjected to spray drying may be 10% by mass or more and 30% by mass or less.

In supercritical drying, the solvent is removed with a supercritical fluid. This reduces the surface tension that acts on the particles and enables the primary particles included in the suspension to be dried while the aggregation of the primary particles is suppressed. Consequently, silica particles having a highly uniform size may be readily produced.

Examples of the substance used as a supercritical fluid include carbon dioxide, water, methanol, ethanol, and acetone. The solvent removal step may be a step of using supercritical carbon dioxide in consideration of treatment efficiency and a reduction in the formation of coarse particles.

Specifically, supercritical drying is performed, for example, in the following manner.

The suspension is charged into a closed reaction container. After liquefied carbon dioxide has been introduced to the reaction container, the pressure inside the closed reaction container is increased with a high-pressure pump while the closed reaction container is heated, in order to bring the carbon dioxide included in the closed reaction container into a supercritical state.

Subsequently, liquefied carbon dioxide is fed into the closed reaction container and the supercritical carbon dioxide is discharged from the closed reaction container, in order to pass the supercritical carbon dioxide through the suspension in the closed reaction container. While the supercritical carbon dioxide passes through the suspension, the solvent dissolves in the supercritical carbon dioxide and is then removed together with the supercritical carbon dioxide, which is discharged outside the closed reaction container.

The temperature and pressure inside the closed reaction container are set to the temperature and pressure at which carbon dioxide is brought into a supercritical state. Since the critical point of carbon dioxide is 31.1° C. and 7.38 MPa, the above temperature and pressure are set to, for example, 40° C. or more and 200° C. or less and 10 MPa or more and 30 MPa or less, respectively.

The flow rate of the supercritical fluid in supercritical drying may be 80 mL/sec or more and 240 mL/sec or less.

The resulting silica particles may be disintegrated or sieved as needed in order to remove coarse particles and aggregates. Disintegration may be performed using, for example, a dry pulverizer, such as a jet mill, a vibration mill, a ball mill, or a pin mill. Sieving may be performed with, for example, a vibration sieve or an air classifier.

EXAMPLES

Details of the exemplary embodiment of the present disclosure are described with reference to Examples below. Note that the exemplary embodiment of the present disclosure is not limited by Examples below. Hereinafter, "%" is on a mass basis unless otherwise specified.

Production of Silica Particles

Examples 1, 3 to 36, and 39 to 44

A suspension including silica particles of each example is prepared in the following manner.

Preparation of Alkali Catalyst Solution

Into a glass reaction container equipped with a metal stirring rod, a dropper nozzle, and a thermometer, a specific amount of methanol, ion-exchange water, and a specific amount of ammonia water ($NH_4OH$) having a specific concentration are charged as described in Tables 1-1 and 1-2. The resulting mixture is stirred to form an alkali catalyst solution.

Granulation of Silica Base Particles by Sol-Gel Method

The temperature of the alkali catalyst solution is adjusted to 40° C. Then, the alkali catalyst solution is purged with nitrogen. Subsequently, while the alkali catalyst solution is stirred, the specific amount of tetramethoxysilane (TMOS) described in Tables 1-1 and 1-2 and 124 parts by mass of ammonia water ($NH_4OH$) including a catalyst ($NH_3$) at a concentration of 7.9% are added dropwise to the alkali catalyst solution simultaneously. Hereby, a suspension including silica base particles is prepared.

Addition of Trifunctional Silane Coupling Agent

The above silica base particle suspension is heated to 40° C. Subsequently, while the suspension is stirred, the specific type and amount of trifunctional silane coupling agent described in Tables 1-1 and 1-2 is added to the suspension. The resulting mixture is stirred for 120 minutes in order to cause a reaction of the trifunctional silane coupling agent. Hereby, an adsorption structure is formed.

Addition of Nitrogen-Containing Compound

The specific type of the nitrogen-containing compound described in Tables 1-1 and 1-2 is diluted with butanol to prepare an alcohol liquid.

The alcohol liquid, which is prepared by diluting the nitrogen-containing compound with butanol, is added to the above suspension. The addition of the alcohol liquid is done such that the amount of the nitrogen-containing compound added relative to 100 parts by mass of the solid component of the silica base particle suspension is equal to the amount described in Tables 1-1 and 1-2. The resulting mixture is stirred at 30° C. for 100 minutes. Hereby, a suspension including the nitrogen-containing compound is prepared.

Drying

Into a reaction tank, 300 parts by mass of the above suspension is charged. While the suspension is stirred, $CO_2$ is charged into the reaction tank. The temperature and pressure inside the reaction tank are increased to the specific temperature and pressure described in Tables 1-1 and 1-2. While stirring is continued at the specific temperature and pressure, $CO_2$ is fed into and discharged from the reaction tank at a flow rate of 5 L/min. Subsequently, the solvent is removed from the tank over 120 minutes. Hereby, silica particles of each example are prepared.

Example 2

Silica particles are prepared as in Example 1, except that spray drying is performed with "Mini Spray Dryer B-290" produced by Nihon BUCHI K.K. while the temperature and pressure inside the cylinder are set to the temperature and pressure described in Tables 1-1 and 1-2 and the silica particle suspension is fed to the dryer at a rate of 0.2 L/hr.

Example 37

Silica particles are prepared as in Example 1, except that a hydrophobic treatment of the surfaces of the silica base particles is performed by, subsequent to the addition of the nitrogen-containing compound, adding a specific amount of hexamethyldisilazane (HMDS) which is 100% by mass of the amount of the solid component of the silica base particles to the suspension and stirring the resulting mixture at 65° C. for 3 hours.

Example 38

Silica particles are prepared as in Example 1, except that the silica base particle suspension is prepared by dispersing 30 g of dry-process silica particles "AEROSIL130" produced by Nippon Aerosil Co., Ltd., which serve as silica base particles, in 300 g of methanol.

Comparative Examples 1 to 3

Silica particles are prepared as in Example 1, except that the types and amounts of the trifunctional silane coupling agent and nitrogen-containing compound used are changed as described in Tables 1-1 and 1-2.

Evaluations

Properties

The following properties of the silica particles prepared in each example are determined by the above-described methods.

Number average particle size (in Table 2, referred to as "Particle size")

Average circularity (in Table 2, referred to as "Circularity")

Volume A of pores having a diameter of 1 nm or more and 50 nm or less which is determined from a pore distribution curve prepared by nitrogen gas adsorption before the 350° C. baking (in Table 2, referred to as "Pore volume A before 350° C. baking")

Volume B of pores having a diameter of 1 nm or more and 50 nm or less which is determined from a pore distribution curve prepared by nitrogen gas adsorption after the 350° C. baking (in Table 2, referred to as "Pore volume B after 350° C. baking")

Volume resistivity Ra measured before the 350° C. baking (in Table 2, referred to as "Volume resistivity Ra before baking")

Volume resistivity Rb measured after the 350° C. baking (in Table 2, referred to as "Volume resistivity Rb after baking")

Amount of OH groups measured by the Sears method (in Table 2, referred to as "Amount of OH groups")

The ratio of the integral C of a signal observed at a chemical shift of −50 ppm or more and −75 ppm or less to the integral of all the signals included in a Si-CP/MAS NMR spectrum (in Table 3, referred to as "Si-CP/MAS area fraction C")

The ratio C/D of the integral C of a signal observed at a chemical shift of −50 ppm or more and −75 ppm or less in a Si-CP/MAS NMR spectrum to the integral D of a signal observed at a chemical shift of −90 ppm or more and −120 ppm or less in the Si-CP/MAS NMR spectrum (in Table 3, referred to as "Si-CP/MAS ratio C/D")

Amounts of Charge in Low- and High-Humidity Environments/Environmental Dependence of Electrostatic Capacitance The amounts of charge stored in the silica particles prepared in each example in low- and high-humidity environments are measured in the following manner in order to determine the environmental dependence of electrostatic capacitance. Note that, among the following evaluation grades, Grades A and B are acceptable.

Details of the evaluation method are as follows.

The silica particles are added to the surface of "MA1010" produced by Nippon Shokubai Co., Ltd. at a proportion of 2% by mass. With 5 g of the above sample, 50 g of "KNI106GSM" produced by JFE Chemical Corporation is mixed. The amount of electric charge measured with "TB200" produced by Toshiba Corporation after the mixed sample has been stirred for 5 minutes with a tumbler shaker in a chamber kept at 10° C. and 10% RH is defined as FC. The amount of electric charge measured with "TB200" produced by Toshiba Corporation after the mixed sample has been stirred for 5 minutes with a tumbler shaker in a chamber kept at 30° C. and 90% RH is defined as FA. The ratio FA/FC is used for evaluation.

A: FA/FC is 0.8 or more and less than 1.1
B: FA/FC is 0.65 or more and less than 0.8
C: FA/FC is 0.5 or more and less than 0.65
D: FA/FC is less than 0.5

Charge Distribution in Low-Temperature, Low-Humidity Environment

The charge distribution of the silica particles prepared in each example in a low-temperature, low-humidity environment (i.e., 10° C./10% RH environment) is determined in the following manner.

The silica particles are added to the surface of "MA1010" produced by Nippon Shokubai Co., Ltd. at a proportion of 2% by mass. With 5 g of the above sample, 50 g of "KNI106GSM" produced by JFE Chemical Corporation is mixed. The mixed sample is stirred for 5 minutes with a tumbler shaker in a chamber kept at 10° C. and 10% RH. Then, an image analysis is conducted by a charge spectrograph method (CSG). An electric charge distribution is defined as the quotient of the difference between the 20%-charge amount Q(20) and the 80%-charge amount Q(80) in the cumulative electric charge distribution divided by the 50%-charge amount Q(50), that is, [Q(80)−Q(20)]/Q(50). The evaluation standards are as follows.

A: [Q(80)−Q(20)]/Q(50) is less than 0.7
B: [Q(80)−Q(20)]/Q(50) is less than 0.8 and 0.7 or more
C: [Q(80)−Q(20)]/Q(50) is less than 1.0 and 0.8 or more
D: [Q(80)−Q(20)]/Q(50) is 1.0 or more Retention of Narrow Charge Distribution in Normal-Temperature, Normal-Humidity Environment The retention of narrow charge distribution of the silica particles prepared in each example in a normal-temperature, normal-humidity environment (i.e., 20° C./50% RH environment) is determined in the following manner.

The silica particles are added to the surface of "MA1010" produced by Nippon Shokubai Co., Ltd. at a proportion of 2% by mass. With 5 g of the above sample, 50 g of "KNI106GSM" produced by JFE Chemical Corporation is mixed. The mixed sample is stirred for 100 minutes with a tumbler shaker in a chamber kept at 20° C. and 50% RH. Then, an image analysis is conducted by a charge spectrograph method (CSG). An electric charge distribution is defined as the quotient of the difference between the 20%-charge amount Q(20) and the 80%-charge amount Q(80) in the cumulative electric charge distribution divided by the 50%-charge amount Q(50), that is, [Q(80)−Q(20)]/Q(50). The evaluation standards are as follows.

A: [Q(80)−Q(20)]/Q(50) is less than 0.75
B: [Q(80)−Q(20)]/Q(50) is less than 0.85 and 0.75 or more
C: [Q(80)−Q(20)]/Q(50) is less than 1.0 and 0.85 or more
D: [Q(80)−Q(20)]/Q(50) is 1.0 or more Table 3 lists the evaluation results.

Details of the abbreviations used in Tables 1-1 and 1-2 are as follows.

MTMS: Methyltrimethoxysilane
DTMS: n-Dodecyltrimethoxysilane
TP-415: $[N^+(CH)_3(C_{14}C_{29})_2]_4Mo_8O_{28}^{4-}$ (produced by Hodogaya Chemical Co., Ltd, N,N-Dimethyl-N-tetradecyl-1-tetradecanaminium, hexa-μ-oxotetra-μ3-oxodi-μ5-oxotetradecaoxooctamolybdate(4-) (4:1) (the amount X extracted with ammonia/methanol mixed solution: 61 to 89 mass %; the ratio of the extraction amount X to the amount Y extracted with water, X/Y: 0.03 to 0.26)

Dimethylstearylammonium chloride (the amount X extracted with ammonia/methanol mixed solution: 75 mass %; the ratio of the extraction amount X to the amount Y extracted with water, X/Y: 0.28)

Tributylamine (the amount X extracted with ammonia/methanol mixed solution: 65 mass %; the ratio of the extraction amount X to the amount Y extracted with water, X/Y: 0.29)

Dimethyloctadecyl[3-(trimethoxysilyl)propyl]ammonium chloride (the amount X extracted with ammonia/methanol mixed solution: 76 mass %; the ratio of the extraction amount X to the amount Y extracted with water, X/Y: 0.25)

Quaternium-80 (the amount X extracted with ammonia/methanol mixed solution: 80 mass %; the ratio of the extraction amount X to the amount Y extracted with water, X/Y: 0.09)

Ditetrakis(dibutyldibenzylammonium)molybdic acid (the amount X extracted with ammonia/methanol mixed solution: 65 mass %; the ratio of the extraction amount X to the amount Y extracted with water, X/Y: 0.15)

Phenethylamine (the amount X extracted with ammonia/methanol mixed solution: 55 mass %; the ratio of the extraction amount X to the amount Y extracted with water, X/Y: 0.28)

4-(2-Octylamino)diphenylamine (the amount X extracted with ammonia/methanol mixed solution: 78 mass %; the ratio of the extraction amount X to the amount Y extracted with water, X/Y: 0.14)

N-benzyl-N-methylethanolamine (the amount X extracted with ammonia/methanol mixed solution: 58 mass %; the ratio of the extraction amount X to the amount Y extracted with water, X/Y: 0.27)

2,3-Bis(2,6-diisopropylphenylimino)butane (the amount X extracted with ammonia/methanol mixed solution: 81 mass %; the ratio of the extraction amount X to the amount Y extracted with water, X/Y: 0.11)

3-Indoleacetonitrile (the amount X extracted with ammonia/methanol mixed solution: 80 mass %; the ratio of the extraction amount X to the amount Y extracted with water, X/Y: 0.12)

n-Hexadecyltrimethylammonium bromide (the amount X extracted with ammonia/methanol mixed solution: 18 mass %; the ratio of the extraction amount X to the amount Y extracted with water, X/Y: 5.28)

TABLE 1-1

| | Granulation of silica base particles | | | | | | | |
|---|---|---|---|---|---|---|---|---|
| | Granulation method | Methanol Mass [part] | Ammonia water Mass [part] | Ammonia concentration % | Silane alkoxide | | Trifunctional silane coupling agent | |
| | | | | | Type | Mass [part] | Type | Mass [part] |
| Example 1 | Sol-gel process | 950 | 166 | 9.6 | TMOS | 1000 | MTMS | 50 |
| Example 2 | Sol-gel process | 950 | 166 | 9.6 | TMOS | 1000 | MTMS | 50 |
| Example 3 | Sol-gel process | 950 | 166 | 9.6 | TMOS | 1000 | MTMS | 22 |
| Example 4 | Sol-gel process | 950 | 166 | 9.6 | TMOS | 1000 | MTMS | 190 |
| Example 5 | Sol-gel process | 950 | 72 | 16.7 | TMOS | 1000 | MTMS | 195 |
| Example 6 | Sol-gel process | 950 | 96 | 16.7 | TMOS | 1000 | MTMS | 120 |
| Example 7 | Sol-gel process | 950 | 200 | 10.0 | TMOS | 1000 | MTMS | 25 |
| Example 8 | Sol-gel process | 950 | 232 | 5.2 | TMOS | 1000 | MTMS | 22 |
| Example 9 | Sol-gel process | 950 | 166 | 9.6 | TMOS | 1000 | MTMS | 22 |
| Example 10 | Sol-gel process | 950 | 166 | 9.6 | TMOS | 1000 | MTMS | 190 |
| Example 11 | Sol-gel process | 950 | 166 | 9.6 | TMOS | 1000 | MTMS | 22 |
| Example 12 | Sol-gel process | 950 | 166 | 9.6 | TMOS | 1000 | MTMS | 25 |
| Example 13 | Sol-gel process | 950 | 166 | 9.6 | TMOS | 1000 | MTMS | 130 |
| Example 14 | Sol-gel process | 950 | 166 | 9.6 | TMOS | 1000 | MTMS | 180 |
| Example 15 | Sol-gel process | 950 | 166 | 9.6 | TMOS | 1000 | MTMS | 30 |
| Example 16 | Sol-gel process | 950 | 166 | 9.6 | TMOS | 1000 | MTMS | 50 |
| Example 17 | Sol-gel process | 950 | 166 | 9.6 | TMOS | 1000 | MTMS | 120 |
| Example 18 | Sol-gel process | 950 | 166 | 9.6 | TMOS | 1000 | MTMS | 180 |
| Example 19 | Sol-gel process | 950 | 110 | 9.1 | TMOS | 450 | MTMS | 100 |
| Example 20 | Sol-gel process | 950 | 220 | 9.1 | TMOS | 1000 | MTMS | 50 |
| Example 21 | Sol-gel process | 950 | 250 | 12.0 | TMOS | 1100 | MTMS | 50 |
| Example 22 | Sol-gel process | 900 | 55 | 9.1 | TMOS | 1000 | MTMS | 50 |
| Example 23 | Sol-gel process | 850 | 72 | 9.7 | TMOS | 1000 | MTMS | 50 |
| Example 24 | Sol-gel process | 950 | 177 | 9.6 | TMOS | 1000 | MTMS | 50 |
| Example 25 | Sol-gel process | 950 | 220 | 9.1 | TMOS | 1000 | MTMS | 50 |
| Example 26 | Sol-gel process | 950 | 166 | 9.6 | TMOS | 1000 | MTMS | 50 |
| Example 27 | Sol-gel process | 950 | 166 | 9.6 | TMOS | 1000 | MTMS | 50 |
| Example 28 | Sol-gel process | 950 | 166 | 9.6 | TMOS | 1000 | MTMS | 23 |
| Example 29 | Sol-gel process | 950 | 166 | 9.6 | TMOS | 1000 | MTMS | 30 |
| Example 30 | Sol-gel process | 950 | 166 | 9.6 | TMOS | 1000 | MTMS | 135 |
| Example 31 | Sol-gel process | 950 | 166 | 9.6 | TMOS | 1000 | MTMS | 142 |
| Example 32 | Sol-gel process | 950 | 166 | 9.6 | TMOS | 1000 | DTMS | 50 |

TABLE 1-1-continued

| | Granulation of silica base particles | | | | | | | |
|---|---|---|---|---|---|---|---|---|
| | | Methanol | Ammonia water | Ammonia concentration | Silane alkoxide | | Trifunctional silane coupling agent | |
| | Granulation method | Mass [part] | Mass [part] | % | Type | Mass [part] | Type | Mass [part] |
| Example 33 | Sol-gel process | 950 | 166 | 9.6 | TMOS | 1000 | MTMS | 50 |
| Example 34 | Sol-gel process | 950 | 166 | 9.6 | TMOS | 1000 | MTMS | 50 |
| Example 35 | Sol-gel process | 950 | 166 | 9.6 | TMOS | 1000 | MTMS | 50 |
| Example 36 | Sol-gel process | 950 | 166 | 9.6 | TMOS | 1000 | MTMS | 50 |
| Example 37 | Sol-gel process | 950 | 166 | 9.6 | TMOS | 1000 | MTMS | 50 |
| Example 38 | Dry process | — | — | — | — | — | MTMS | 50 |
| Example 39 | Sol-gel process | 950 | 166 | 9.6 | TMOS | 1000 | MTMS | 50 |
| Example 40 | Sol-gel process | 950 | 166 | 9.6 | TMOS | 1000 | MTMS | 50 |
| Example 41 | Sol-gel process | 950 | 166 | 9.6 | TMOS | 1000 | MTMS | 50 |
| Example 42 | Sol-gel process | 950 | 166 | 9.6 | TMOS | 1000 | MTMS | 50 |
| Example 43 | Sol-gel process | 950 | 166 | 9.6 | TMOS | 1000 | MTMS | 50 |
| Example 44 | Sol-gel process | 950 | 166 | 9.6 | TMOS | 1000 | MTMS | 50 |
| Comparative example 1 | Sol-gel process | 950 | 166 | 9.6 | TMOS | 1000 | MTMS | 10 |
| Comparative example 2 | Sol-gel process | 950 | 166 | 9.6 | TMOS | 1000 | MTMS | 260 |
| Comparative example 3 | Sol-gel process | 950 | 166 | 9.6 | TMOS | 1000 | MTMS | 20 |

TABLE 1-2

| | N-containing compound | | Hydrophobizing agent | | Drying step | | |
|---|---|---|---|---|---|---|---|
| | Type | Mass [part] | Type | Mass [part] | Drying method | Temperature ° C. | Pressure MPa |
| Example 1 | TP415 | 5 | — | — | Supercritical drying | 150 | 15 |
| Example 2 | TP415 | 2 | — | — | Spray drying | 100 | 0.1 |
| Example 3 | TP415 | 1 | — | — | Supercritical drying | 150 | 15 |
| Example 4 | TP415 | 45 | — | — | Supercritical drying | 150 | 15 |
| Example 5 | TP415 | 5 | — | — | Supercritical drying | 150 | 15 |
| Example 6 | TP415 | 5 | — | — | Supercritical drying | 150 | 15 |
| Example 7 | TP415 | 5 | — | — | Supercritical drying | 150 | 15 |
| Example 8 | TP415 | 5 | — | — | Supercritical drying | 150 | 15 |
| Example 9 | TP415 | 5 | — | — | Supercritical drying | 150 | 15 |
| Example 10 | TP415 | 5 | — | — | Supercritical drying | 150 | 15 |
| Example 11 | TP415 | 0.5 | — | — | Supercritical drying | 150 | 15 |
| Example 12 | TP415 | 3 | — | — | Supercritical drying | 150 | 15 |
| Example 13 | TP415 | 12 | — | — | Supercritical drying | 150 | 15 |
| Example 14 | TP415 | 19 | — | — | Supercritical drying | 150 | 15 |
| Example 15 | TP415 | 4 | — | — | Supercritical drying | 150 | 15 |
| Example 16 | TP415 | 4 | — | — | Supercritical drying | 150 | 15 |
| Example 17 | TP415 | 5 | — | — | Supercritical drying | 150 | 15 |
| Example 18 | TP415 | 5 | — | — | Supercritical drying | 150 | 15 |
| Example 19 | TP415 | 10 | — | — | Supercritical drying | 150 | 15 |
| Example 20 | TP415 | 4 | — | — | Supercritical drying | 150 | 15 |
| Example 21 | TP415 | 4 | — | — | Supercritical drying | 150 | 15 |
| Example 22 | TP415 | 4 | — | — | Supercritical drying | 150 | 15 |
| Example 23 | TP415 | 4 | — | — | Supercritical drying | 150 | 15 |
| Example 24 | TP415 | 4 | — | — | Supercritical drying | 150 | 15 |
| Example 25 | TP415 | 4 | — | — | Supercritical drying | 150 | 15 |
| Example 26 | TP415 | 20 | — | — | Supercritical drying | 150 | 15 |
| Example 27 | TP415 | 0.53 | — | — | Supercritical drying | 150 | 15 |
| Example 28 | TP415 | 0.8 | — | — | Supercritical drying | 150 | 15 |
| Example 29 | TP415 | 1.2 | — | — | Supercritical drying | 150 | 15 |
| Example 30 | TP415 | 11 | — | — | Supercritical drying | 150 | 15 |
| Example 31 | TP415 | 15 | — | — | Supercritical drying | 150 | 15 |
| Example 32 | TP415 | 5 | — | — | Supercritical drying | 150 | 15 |
| Example 33 | Dimethylstearylammonium chloride | 5 | — | — | Supercritical drying | 150 | 15 |
| Example 34 | Tributylamine | 5 | — | — | Supercritical drying | 150 | 15 |
| Example 35 | Dimethyloctadecyl[3-(trimethoxysilyl)propyl]ammonium chloride | 5 | — | — | Supercritical drying | 150 | 15 |
| Example 36 | Quaternium-80 | 5 | — | — | Supercritical drying | 150 | 15 |
| Example 37 | TP415 | 5 | HMDS | 50 | Supercritical drying | 150 | 15 |
| Example 38 | TP415 | 5 | — | — | Supercritical drying | 150 | 15 |
| Example 39 | Ditetrakis(dibutyldibenzylammonium)molybdic acid | 5 | — | — | Supercritical drying | 150 | 15 |
| Example 40 | Phenethylamine | 5 | — | — | Supercritical drying | 150 | 15 |
| Example 41 | 4-(2-Octylamino)diphenylamine | 5 | — | — | Supercritical drying | 150 | 15 |

TABLE 1-2-continued

|  | N-containing compound | | Hydrophobizing agent | | Drying step | | |
|---|---|---|---|---|---|---|---|
|  | Type | Mass [part] | Type | Mass [part] | Drying method | Temperature °C. | Pressure MPa |
| Example 42 | N-benzyl-N-methylethanolamine | 5 | — | — | Supercritical drying | 150 | 15 |
| Example 43 | 2,3-Bis(2,6-diisopropylphenylimino)butane | 5 | — | — | Supercritical drying | 150 | 15 |
| Example 44 | 3-Indoleacetonitrile | 5 | — | — | Supercritical drying | 150 | 15 |
| Comparative example 1 | TP415 | 0.1 | — | — | Supercritical drying | 150 | 15 |
| Comparative example 2 | TP415 | 50 | — | — | Supercritical drying | 150 | 15 |
| Comparative example 3 | n-Hexadecyltrimethylammonium bromide | 0.2 | — | — | Supercritical drying | 150 | 15 |

TABLE 2

| | Particle properties | | | | | | | | |
|---|---|---|---|---|---|---|---|---|---|
| | Particle size nm | Circularity — | Pore volume A before 350° C. baking cm³/g | Pore volume B after 350° C. baking cm³/g | B/A — | Volume resistivity Ra before baking Ω·cm | Volume resistivity Rb after baking Ω·cm | Ra/Rb — | Amount of OH groups groups/nm² |
| Example 1 | 61 | 0.88 | 0.52 | 0.87 | 1.67 | $1.0 \times 10^{10}$ | $1.0 \times 10^{11.5}$ | 0.032 | 2.91 |
| Example 2 | 63 | 0.89 | 0.62 | 0.85 | 1.37 | $1.0 \times 10^{9.5}$ | $1.0 \times 10^{11.2}$ | 0.020 | 3.90 |
| Example 3 | 62 | 0.88 | 0.18 | 0.21 | 1.20 | $1.0 \times 10^{11}$ | $1.0 \times 10^{11.5}$ | 0.316 | 5.42 |
| Example 4 | 61 | 0.86 | 0.60 | 3.00 | 5.00 | $1.0 \times 10^{10.9}$ | $1.0 \times 10^{12.5}$ | 0.025 | 0.25 |
| Example 5 | 62 | 0.87 | 2.10 | 2.70 | 1.29 | $1.0 \times 10^{11.1}$ | $1.0 \times 10^{12.9}$ | 0.016 | 0.15 |
| Example 6 | 60 | 0.88 | 1.10 | 1.50 | 1.36 | $1.0 \times 10^{10.1}$ | $1.0 \times 10^{11.8}$ | 0.020 | 0.20 |
| Example 7 | 61 | 0.88 | 0.20 | 0.40 | 2.00 | $1.0 \times 10^{8.2}$ | $1.0 \times 10^{11.0}$ | 0.002 | 5.41 |
| Example 8 | 63 | 0.89 | 0.18 | 0.31 | 1.72 | $1.0 \times 10^{7.5}$ | $1.0 \times 10^{10.9}$ | 0.000 | 5.72 |
| Example 9 | 61 | 0.88 | 0.12 | 0.20 | 1.67 | $1.0 \times 10^{8.1}$ | $1.0 \times 10^{11.2}$ | 0.001 | 5.48 |
| Example 10 | 62 | 0.86 | 2.45 | 3.00 | 1.22 | $1.0 \times 10^{11.2}$ | $1.0 \times 10^{12.8}$ | 0.025 | 0.31 |
| Example 11 | 60 | 0.87 | 0.17 | 0.22 | 1.29 | $1.0 \times 10^{10.1}$ | $1.0 \times 10^{10.9}$ | 0.158 | 5.28 |
| Example 12 | 64 | 0.86 | 0.18 | 0.25 | 1.39 | $1.0 \times 10^{10.6}$ | $1.0 \times 10^{11.0}$ | 0.398 | 5.14 |
| Example 13 | 62 | 0.87 | 0.50 | 1.50 | 3.00 | $1.0 \times 10^{10.8}$ | $1.0 \times 10^{11.9}$ | 0.079 | 0.31 |
| Example 14 | 61 | 0.88 | 0.52 | 1.70 | 3.27 | $1.0 \times 10^{11.2}$ | $1.0 \times 10^{12.3}$ | 0.079 | 0.29 |
| Example 15 | 61 | 0.87 | 0.20 | 0.28 | 1.40 | $1.0 \times 10^{9.5}$ | $1.0 \times 10^{11.2}$ | 0.020 | 4.98 |
| Example 16 | 61 | 0.9 | 0.21 | 0.30 | 1.43 | $1.0 \times 10^{10.2}$ | $1.0 \times 10^{11.4}$ | 0.063 | 3.01 |
| Example 17 | 63 | 0.89 | 1.45 | 1.80 | 1.24 | $1.0 \times 10^{10.8}$ | $1.0 \times 10^{11.9}$ | 0.079 | 0.31 |
| Example 18 | 62 | 0.88 | 1.62 | 2.30 | 1.42 | $1.0 \times 10^{11.0}$ | $1.0 \times 10^{12.3}$ | 0.050 | 0.27 |
| Example 19 | 10 | 0.77 | 0.98 | 2.82 | 2.88 | $1.0 \times 10^{10.8}$ | $1.0 \times 10^{11.8}$ | 0.100 | 0.60 |
| Example 20 | 80 | 0.91 | 0.55 | 1.21 | 2.20 | $1.0 \times 10^{10.3}$ | $1.0 \times 10^{11.5}$ | 0.063 | 4.20 |
| Example 21 | 200 | 0.93 | 0.58 | 1.31 | 2.26 | $1.0 \times 10^{10.1}$ | $1.0 \times 10^{10.9}$ | 0.158 | 4.40 |
| Example 22 | 62 | 0.6 | 0.80 | 1.10 | 1.38 | $1.0 \times 10^{11.0}$ | $1.0 \times 10^{12.3}$ | 0.050 | 0.30 |
| Example 23 | 62 | 0.7 | 0.81 | 1.01 | 1.25 | $1.0 \times 10^{11.1}$ | $1.0 \times 10^{12.1}$ | 0.100 | 0.50 |
| Example 24 | 62 | 0.9 | 0.53 | 0.83 | 1.57 | $1.0 \times 10^{10.8}$ | $1.0 \times 10^{11.8}$ | 0.100 | 3.20 |
| Example 25 | 62 | 0.96 | 0.42 | 0.73 | 1.74 | $1.0 \times 10^{10}$ | $1.0 \times 10^{11.5}$ | 0.032 | 3.50 |
| Example 26 | 62 | 0.87 | 0.21 | 0.80 | 3.81 | $1.0 \times 10^{7}$ | $1.0 \times 10^{11.3}$ | 0.005 | 3.00 |
| Example 27 | 62 | 0.85 | 0.70 | 0.85 | 1.21 | $1.0 \times 10^{11.5}$ | $1.0 \times 10^{11.5}$ | 0.501 | 2.98 |
| Example 28 | 62 | 0.87 | 0.15 | 0.30 | 2.00 | $1.0 \times 10^{10.95}$ | $1.0 \times 10^{10.9}$ | 0.891 | 5.31 |
| Example 29 | 62 | 0.86 | 0.25 | 0.33 | 1.32 | $1.0 \times 10^{11.0}$ | $1.0 \times 10^{11.1}$ | 0.794 | 5.01 |
| Example 30 | 62 | 0.88 | 0.82 | 1.30 | 1.59 | $1.0 \times 10^{10.1}$ | $1.0 \times 10^{12.0}$ | 0.013 | 0.30 |
| Example 31 | 62 | 0.89 | 0.93 | 1.52 | 1.63 | $1.0 \times 10^{10}$ | $1.0 \times 10^{12.2}$ | 0.006 | 0.31 |
| Example 32 | 61 | 0.88 | 0.80 | 1.21 | 1.51 | $1.0 \times 10^{10.9}$ | $1.0 \times 10^{12.3}$ | 0.040 | 3.40 |
| Example 33 | 61 | 0.88 | 0.29 | 0.88 | 3.03 | $1.0 \times 10^{10.1}$ | $1.0 \times 10^{11.1}$ | 0.100 | 3.00 |
| Example 34 | 61 | 0.88 | 0.35 | 0.65 | 1.86 | $1.0 \times 10^{10.3}$ | $1.0 \times 10^{12.3}$ | 0.010 | 2.98 |
| Example 35 | 61 | 0.88 | 0.25 | 0.79 | 3.16 | $1.0 \times 10^{11}$ | $1.0 \times 10^{12.1}$ | 0.079 | 0.21 |
| Example 36 | 61 | 0.88 | 0.18 | 0.67 | 3.72 | $1.0 \times 10^{11.1}$ | $1.0 \times 10^{12.2}$ | 0.020 | 1.20 |
| Example 37 | 61 | 0.88 | 0.31 | 0.51 | 1.65 | $1.0 \times 10^{11.5}$ | $1.0 \times 10^{13}$ | 0.032 | 2.91 |
| Example 38 | 38 | 0.71 | 0.38 | 0.46 | 1.21 | $1.0 \times 10^{11.4}$ | $1.0 \times 10^{12.8}$ | 0.010 | 0.15 |
| Example 39 | 61 | 0.88 | 0.65 | 0.88 | 1.35 | $1.0 \times 10^{10.1}$ | $1.0 \times 10^{11.3}$ | 0.063 | 2.95 |
| Example 40 | 61 | 0.88 | 0.68 | 0.88 | 1.29 | $1.0 \times 10^{10.4}$ | $1.0 \times 10^{11.0}$ | 0.251 | 2.89 |
| Example 41 | 61 | 0.88 | 0.54 | 0.87 | 1.61 | $1.0 \times 10^{10.8}$ | $1.0 \times 10^{11.5}$ | 0.200 | 2.91 |
| Example 42 | 61 | 0.88 | 0.51 | 0.85 | 1.67 | $1.0 \times 10^{10.1}$ | $1.0 \times 10^{11.6}$ | 0.032 | 2.98 |
| Example 43 | 61 | 0.88 | 0.58 | 0.85 | 1.47 | $1.0 \times 10^{10.2}$ | $1.0 \times 10^{11.5}$ | 0.050 | 2.94 |
| Example 44 | 61 | 0.88 | 0.64 | 0.86 | 1.34 | $1.0 \times 10^{10.8}$ | $1.0 \times 10^{11.7}$ | 0.126 | 2.89 |
| Comparative example 1 | 65 | 0.89 | 0.14 | 0.15 | 1.07 | $1.0 \times 10^{11.0}$ | $1.0 \times 10^{11.0}$ | 1.000 | 5.61 |
| Comparative example 2 | 62 | 0.91 | 0.25 | 3.24 | 12.96 | $1.0 \times 10^{11.0}$ | $1.0 \times 10^{13.1}$ | 0.008 | 0.18 |
| Comparative example 3 | 61 | 0.88 | 0.18 | 0.20 | 1.11 | $1.0 \times 10^{8.2}$ | $1.0 \times 10^{11.3}$ | 0.001 | 2.91 |

TABLE 3

| | Si-CP/MAS area fraction C % | Si-CP/MAS ratio C/D — | N-containing compound Content (in terms of N element) mass % | Amount of charge FA at high humidity μC | Amount of charge FC at low humidity μC | Environmental dependence of electrostatic capacitance — | Charge distribution at low temperature and low humidity — | Retention of narrow charge distribution at normal temperature and normal humidity — |
|---|---|---|---|---|---|---|---|---|
| Example 1 | 7.6 | 0.156 | 0.040 | 25.5 | 30.2 | A | A | A |
| Example 2 | 7.5 | 0.154 | 0.014 | 22.5 | 27.8 | A | A | A |
| Example 3 | 5.5 | 0.101 | 0.009 | 23.5 | 35.0 | B | B | B |
| Example 4 | 45.0 | 0.718 | 0.371 | 31.0 | 32.3 | A | A | B |
| Example 5 | 46.0 | 0.742 | 0.040 | 30.1 | 33.8 | A | B | A |
| Example 6 | 27.0 | 0.471 | 0.039 | 28.1 | 30.5 | A | B | A |
| Example 7 | 3.9 | 0.121 | 0.041 | 23.1 | 25.6 | A | B | A |
| Example 8 | 5.1 | 0.102 | 0.042 | 21.0 | 23.8 | A | B | A |
| Example 9 | 4.9 | 0.105 | 0.042 | 23.0 | 25.8 | A | B | A |
| Example 10 | 45.1 | 0.721 | 0.039 | 32.3 | 36.8 | A | B | A |
| Example 11 | 5.1 | 0.103 | 0.005 | 20.5 | 30.8 | B | B | A |
| Example 12 | 5.1 | 0.125 | 0.024 | 22.1 | 32.1 | B | B | B |
| Example 13 | 29.8 | 0.492 | 0.101 | 29.8 | 33.5 | A | A | A |
| Example 14 | 4.2 | 0.298 | 0.155 | 30.1 | 36.8 | A | A | A |
| Example 15 | 5.0 | 0.135 | 0.033 | 22.1 | 28.1 | B | B | A |
| Example 16 | 9.6 | 0.157 | 0.033 | 25.8 | 31.2 | A | B | A |
| Example 17 | 27.5 | 0.480 | 0.040 | 25.6 | 32.1 | A | A | A |
| Example 18 | 42.1 | 0.661 | 0.040 | 28.1 | 36.1 | B | A | A |
| Example 19 | 53.1 | 0.749 | 0.083 | 32.5 | 35.1 | A | A | A |
| Example 20 | 9.6 | 0.153 | 0.030 | 25.2 | 31.5 | A | A | A |
| Example 21 | 8.5 | 0.148 | 0.030 | 22.3 | 29.1 | B | B | A |
| Example 22 | 9.7 | 0.155 | 0.032 | 28.1 | 37.8 | B | A | A |
| Example 23 | 9.4 | 0.156 | 0.031 | 28.5 | 37.2 | B | B | A |
| Example 24 | 9.5 | 0.154 | 0.032 | 25.4 | 32.1 | B | A | A |
| Example 25 | 9.3 | 0.157 | 0.031 | 23.0 | 28.9 | B | B | A |
| Example 26 | 9.1 | 0.149 | 0.168 | 24.5 | 26.1 | A | A | A |
| Example 27 | 9.5 | 0.155 | 0.005 | 28.5 | 37.1 | B | B | A |
| Example 28 | 5.1 | 0.109 | 0.008 | 25.1 | 36.9 | B | B | B |
| Example 29 | 5.2 | 0.128 | 0.012 | 26.8 | 37.1 | B | B | B |
| Example 30 | 31.0 | 0.510 | 0.092 | 26.5 | 30.5 | A | A | A |
| Example 31 | 33.5 | 0.531 | 0.131 | 28.1 | 30.1 | A | A | A |
| Example 32 | 9.8 | 0.158 | 0.042 | 31.2 | 38.1 | A | A | A |
| Example 33 | 9.1 | 0.154 | 0.210 | 24.8 | 30.5 | A | B | B |
| Example 34 | 9.3 | 0.157 | 0.370 | 28.1 | 31.2 | A | B | B |
| Example 35 | 8.5 | 0.510 | 0.140 | 29.9 | 35.5 | A | B | B |
| Example 36 | 9.1 | 0.150 | 0.118 | 30.1 | 35.2 | A | B | B |
| Example 37 | 8.9 | 0.156 | 0.040 | 25.5 | 30.2 | A | A | A |
| Example 38 | 5.9 | 0.142 | 0.030 | 32.1 | 41.2 | B | B | A |
| Example 39 | 8.0 | 0.153 | 0.091 | 25.1 | 37.2 | B | A | A |
| Example 40 | 8.9 | 0.156 | 0.449 | 22.5 | 36.5 | B | B | B |
| Example 41 | 9.5 | 0.155 | 0.212 | 25.4 | 36.9 | B | B | B |
| Example 42 | 9.4 | 0.156 | 0.400 | 25.3 | 37.8 | B | B | B |
| Example 43 | 9.5 | 0.157 | 0.168 | 25.9 | 38.1 | B | B | B |
| Example 44 | 9.9 | 0.159 | 0.412 | 25.5 | 36.9 | B | B | B |
| Comparative example 1 | 2.6 | 0.040 | 0.001 | 22.1 | 41.5 | D | D | D |
| Comparative example 2 | 65.0 | 0.922 | 0.251 | 20.5 | 23 | A | C | D |
| Comparative example 3 | 4.2 | 0.120 | 0.007 | 18.9 | 28.3 | B | D | D |

The above results confirm that the silica particle samples prepared in Examples have a narrower charge distribution when being charged than the silica particle samples prepared in Comparative examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:
1. Silica particles comprising:
a nitrogen-containing compound,
wherein, when A is a volume of pores having a diameter of 1 nm or more and 50 nm or less before the silica particles are baked at 350° C. and B is a volume of pores having a diameter of 1 nm or more and 50 nm or less after the silica particles are baked at 350° C., the volumes being determined from a pore size distribution curve obtained by nitrogen gas adsorption, B/A is 1.2 or more and 5 or less and B is 0.2 cm$^3$/g or more and 3 cm$^3$/g or less, and
wherein the pores are composed of a product of a reaction of a trifunctional silane coupling agent, and
wherein the nitrogen-containing compound is at least one selected from the group consisting of a quaternary ammonium salt including molybdenum and a mixture of a quaternary ammonium salt with a metal oxide including molybdenum.

2. The silica particles according to claim 1, wherein the B/A is 1.4 or more and 3 or less.

3. The silica particles according to claim 1, wherein the B is 0.3 cm$^3$/g or more and 1.8 cm$^3$/g or less.

4. The silica particles according to claim 1, the silica particles having a number average size of 10 nm or more and 200 nm or less.

5. The silica particles according to claim 4, wherein the number average size is 10 nm or more and 80 nm or less.

6. The silica particles according to claim 1, the silica particles having an average circularity of 0.60 or more and 0.96 or less.

7. The silica particles according to claim 1, the silica particles having an average circularity of 0.70 or more and 0.92 or less.

8. The silica particles according to claim 1, the silica particles having a volume resistivity of $1.0 \times 10^7$ Ω·cm or more and $1.0 \times 10^{11.5}$ Ω·cm or less.

9. The silica particles according to claim 1, wherein, when volume resistivity values of the silica particles, the volume resistivity values being measured before and after the silica particles are baked at 350° C., are defined as Ra and Rb, respectively, Ra/Rb is 0.01 or more and 0.8 or less.

10. The silica particles according to claim 1, wherein a ratio of an integral C of a signal observed at a chemical shift of −50 ppm or more and −75 ppm or less in a $^{29}$Si solid-state nuclei magnetic resonance (NMR) spectrum of the silica particles, the $^{29}$Si solid-state NMR spectrum being obtained by cross polarization/magic angle spinning (CP/MAS), to an integral D of a signal observed at a chemical shift of −90 ppm or more and −120 ppm or less in the $^{29}$Si solid-state NMR spectrum, that is, C/D, is 0.10 or more and 0.75 or less.

11. The silica particles according to claim 1, wherein a content of the nitrogen-containing compound is 0.008% by mass or more and 0.45% by mass or less of the amount of the silica particles in terms of nitrogen atoms.

12. The silica particles according to claim 1, wherein a ratio of a net intensity of molybdenum to a net intensity of silicon which are determined by X-ray fluorescence analysis (Mo/Si) is 0.035 or more and 0.35 or less.

13. The silica particles according to claim 1, wherein the quaternary ammonium salt is represented by following Formula (AM):

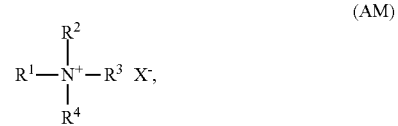

(AM)

wherein, in Formula (AM), R$^1$, R$^2$, R$^3$, and R$^4$ each independently represent a hydrogen atom or an alkyl, aralkyl, or aryl group that may include a substituent; and X$^-$ represents an anion, wherein at least one of the R$^1$, R$^2$, R$^3$, and R$^4$ represents an alkyl, aralkyl, or aryl group that may include the substituent; two or more of the R$^1$, R$^2$, R$^3$, and R$^4$ may be joined to one another to form an aliphatic, aromatic, or hetero ring; and the substituent is independently selected from the group consisting of a nitrile group, a carbonyl group, an ether group, an amide group, a siloxane group, a silyl group, and a silanealkoxy group.

14. The silica particles according to claim 13, wherein the anion represented by X$^-$ is an inorganic anion selected from the groups consisting of MoO$_4{}^{2-}$, Mo$_2$O$_7{}^{2-}$, Mo$_3$O$_{10}{}^{2-}$, Mo$_4$O$_{13}{}^{2-}$, Mo$_7$O$_{24}{}^{2-}$, and Mo$_8$O$_{26}{}^{4-}$.

15. The silica particles according to claim 1, wherein the nitrogen-containing compound is the mixture of the quaternary ammonium salt with the metal oxide including molybdenum, and the metal oxide including molybdenum is selected from the group consisting of a molybdenum oxide, an alkali metal salt of molybdenum acid, and an alkaline-earth metal salt of molybdenum acid.

16. The silica particles according to claim 1, wherein the pores are composed of a product of reaction between the functional groups of the trifunctional silane coupling agent.

17. A method for producing the silica particles according to claim 1, the method comprising:
forming the pores composed of the product of reaction of the trifunctional silane coupling agent on at least a part of surfaces of silica base particles; and
adsorbing a nitrogen-containing compound onto at least a part of the pores formed in the product of reaction of the trifunctional silane coupling agent.

* * * * *